(12) United States Patent
Nishita

(10) Patent No.: US 11,668,825 B2
(45) Date of Patent: Jun. 6, 2023

(54) MEASUREMENT APPARATUS AND CONTROL METHOD OF MEASUREMENT APPARATUS

(71) Applicant: TOPCON CORPORATION, Tokyo (JP)

(72) Inventor: Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 620 days.

(21) Appl. No.: 16/746,466

(22) Filed: Jan. 17, 2020

(65) Prior Publication Data

US 2020/0233083 A1    Jul. 23, 2020

(30) Foreign Application Priority Data

Jan. 18, 2019    (JP) .............................. JP2019-006779

(51) Int. Cl.
*G01S 17/08* (2006.01)
*G01S 17/89* (2020.01)
*G01S 7/481* (2006.01)

(52) U.S. Cl.
CPC .............. *G01S 17/08* (2013.01); *G01S 17/89* (2013.01)

(58) Field of Classification Search
CPC .................................. G01S 17/08; G01S 17/89
See application file for complete search history.

(56) References Cited

U.S. PATENT DOCUMENTS 5,235,376 A * 8/1993 Inoue ..................... G03B 17/38
                                                         396/56
7,412,022 B2 * 8/2008 Jupiter ................. G01N 23/046
                                                         378/82

(Continued)

FOREIGN PATENT DOCUMENTS

JP          3704706 B2 * 3/2002 .............. F16P 3/142
JP       2005347790    * 5/2004

(Continued)

OTHER PUBLICATIONS

Notice of Reasons for Refusal dated Nov. 2, 2022 in connection with Japanese Patent Application No. 2019-006779, 7 pgs. (including translation).

*Primary Examiner* — Zaihan Jiang
(74) *Attorney, Agent, or Firm* — Chiesa, Shahinian & Giantomasi PC

(57) ABSTRACT

An apparatus and method are provided that can identify an array direction of a measurement object formed in a linear shape and efficiently perform a localized measurement of the measurement object. A measurement apparatus includes a distance measuring unit, a deflecting unit which deflects a direction of emission of measurement light with respect to a reference optical axis and which is capable of performing scanning with the measurement light with respect to a prescribed center in a circumferential direction, and a calculation control unit which controls the distance measuring unit and the deflecting unit. The calculation control unit detects coordinates of intersection points of a measurement object formed in a linear shape and a scanned trajectory of the measurement light with the basis of a distance measurement result by the distance measuring unit and the direction of emission that is deflected by the deflecting unit, and identifies an array direction of the measurement object on the basis of the coordinates of a plurality of intersection points.

9 Claims, 15 Drawing Sheets

(56) References Cited

U.S. PATENT DOCUMENTS

| | | | |
|---|---|---|---|
| 10,697,758 B2 | 6/2020 | Ohtomo et al. | |
| 10,809,360 B2 | 10/2020 | Ohtomo et al. | |
| 10,895,632 B2 | 1/2021 | Ohtomo et al. | |
| 2018/0023944 A1 | 1/2018 | Ohtomo et al. | |
| 2018/0095174 A1* | 4/2018 | Mertz | G01B 11/002 |
| 2018/0106615 A1* | 4/2018 | Ohtomo | G01S 17/42 |
| 2018/0284235 A1 | 10/2018 | Ohtomo et al. | |
| 2018/0329041 A1 | 11/2018 | Ohtomo et al. | |

FOREIGN PATENT DOCUMENTS

| | | |
|---|---|---|
| JP | 2007212264 A | 8/2007 |
| JP | 2010151577 A | 7/2010 |
| JP | 2018013350 A | 1/2018 |
| JP | 2018-066571 A | 4/2018 |
| JP | 2018173346 A | 11/2018 |
| JP | 2018189576 A | 11/2018 |

\* cited by examiner

MEASUREMENT APPARATUS AND CONTROL METHOD OF MEASUREMENT APPARATUS

CROSS-REFERENCE TO RELATED APPLICATIONS

This application is based upon and claims benefit of priority from Japanese Patent Application No. 2019-006779, filed Jan. 18, 2019, the entire contents of which are incorporated herein by reference.

TECHNICAL FIELD

The present invention relates to a measurement apparatus and a control method of the measurement apparatus.

BACKGROUND

In recent years, laser scanners that acquire point group data are being used as laser scanners for measuring distances and measuring geometries in the fields of civil engineering, construction, and the like. With conventional laser scanners, a range of a scanning area is set in advance and scanning conditions (for example, a scanning speed and a light emission frequency) are temporarily set, in which case the entire scanning area is scanned under the set scanning conditions.

With such a conventional laser scanner, in order to increase scanning density (the number of pieces of measurement point data per unit area) of any measured portion, scanning density of an entire scanning area must be increased and an enormous amount of scanned data must be acquired. In consideration thereof, in Japanese Patent Application Laid-open No. 2018-066571, scanned data is acquired in an efficient manner by setting a portion that requires high scanning density as a localized measurement range and scanning the localized measurement range at high scanning density.

SUMMARY

In the laser scanner disclosed in Japanese Patent Application Laid-open No. 2018-066571, a localized measurement range is a portion visually determined by a worker or a portion for which a large number of edges are extracted from image data acquired by an imaging unit. However, when a worker visually sets a localized measurement range, a setting operation to be performed by the worker is both complicated and significantly time-consuming. In addition, when setting a localized measurement range by extracting edges from image data, not only does processing of the image data require both time and processing load but it is impossible to efficiently measure only a desired measurement object.

In particular, when a measurement object is formed in a linear shape such as rebars used in construction of a building, desirably, only the measurement object is set as a localized measurement range and other objects are not set as the localized measurement range in order to measure the measurement object in an efficient manner. However, a setting operation by a worker for visually setting a localized measurement range is complicated and a large processing load is required to set the localized measurement range by processing image data.

The present invention has been made in order to solve the problem described above, and an object of the present invention is to provide a measurement apparatus capable of identifying an array direction of a measurement object formed in a linear shape and efficiently executing a localized measurement of the measurement object without requiring a setting operation by a worker or a large processing load and to provide a control method of the measurement apparatus.

According to the present invention, the problem described above can be solved by a measurement apparatus including: a distance measuring unit, the distance measuring unit including a light producing element which produces measurement light; a measurement light emitting unit which emits the measurement light; a light receiving unit which receives reflected measurement light; and a light receiving element which receives the reflected measurement light and generates a light reception signal; and measuring a distance to a measurement object on the basis of a light reception signal from the light receiving element; a deflecting unit which deflects a direction of emission of the measurement light with respect to a reference optical axis and which is capable of performing scanning with the measurement light with respect to a prescribed center in a circumferential direction; and a control unit which controls the distance measuring unit and the deflecting unit, wherein the control unit detects coordinates of intersection points of the measurement object that is formed in a linear shape and a scanned trajectory with the measurement light on the basis of a distance measurement result by the distance measuring unit and the direction of emission that is deflected by the deflecting unit, and identifies an array direction of the measurement object on the basis of coordinates of a plurality of the intersection points.

According to the measurement apparatus with the present configuration, coordinates of an intersection point of a measurement object that is formed in a linear shape and a scanned trajectory with measurement light are detected by the control unit on the basis of a distance measurement result by the distance measuring unit and a direction of emission that is deflected by the deflecting unit. In addition, the control unit identifies an array direction of the measurement object on the basis of coordinates of a plurality of the intersection points. Since the array direction of the measurement object is identified, a localized measurement of the measurement object can be executed in an efficient manner in the identified array direction.

In the measurement apparatus according to the present invention, preferably, the measurement object includes a first measurement object that extends in a linear shape in a first direction and a second measurement object that extends in a linear shape in a second direction perpendicular to the first direction, the first measurement object and the second measurement object are adjacently arranged in a grid pattern, and the control unit controls a deflection operation of the deflecting unit so that the prescribed center is arranged at an intersection position where the first measurement object and the second measurement object intersect with each other, detects coordinates of two pairs of the intersection points arranged at point-symmetric positions with respect to the prescribed center, identifies an array direction of the first measurement object on the basis of the coordinates of one of the two pairs of intersection points, and identifies an array direction of the second measurement object on the basis of the coordinates of the other of the two pairs of intersection points.

According to the measurement apparatus with the present configuration, by arranging a prescribed center of a scanned trajectory with measurement light at an intersection position where the first measurement object that extends in a linear shape and the second measurement object that extends in a linear shape in a direction perpendicular to the first measurement object, coordinates of two pairs of intersection points arranged at point-symmetric positions with respect to the prescribed center are detected. In addition, array directions of both the first measurement object and the second measurement object can be simultaneously identified on the basis of the coordinates of one of the two pairs of intersection points and the coordinates of the other pair of intersection points.

In the measurement apparatus according to the present invention, preferably, the control unit controls a deflection operation of the deflecting unit so that, when four of the intersection points are detected, a center of gravity of coordinates of the four intersection points matches the prescribed center.

According to the measurement apparatus with the present configuration, when four intersection points are detected, by matching a center of gravity of the intersection points with a center of a scanned trajectory with measurement light, coordinates of two pairs of intersection points arranged at point-symmetric positions with respect to the prescribed center can be reliably detected.

In the measurement apparatus according to the present invention, preferably, the control unit identifies, when detecting a plurality of the intersection points, an array direction of the measurement object on the basis of coordinates of a pair of the intersection points arranged adjacent to each other.

According to the measurement apparatus with the present configuration, since coordinates of a pair of intersection points arranged adjacent to each other are highly likely to be a measurement result of a same measurement object, an array direction of the measurement object can be reliably identified on the basis of coordinates of a pair of the intersection points arranged adjacent to each other.

In the measurement apparatus according to the present invention, preferably, the control unit calculates a plurality of array directions on the basis of coordinates of a plurality of pairs of the intersection points respectively arranged adjacent to each other, and identifies an array direction of the measurement object on the basis of the plurality of array directions.

According to the measurement apparatus with the present configuration, a plurality of array directions can be calculated on the basis of coordinates of a plurality of pairs of intersection points and an array direction of the measurement object can be identified with high accuracy by performing, for example, an averaging process.

In the measurement apparatus according to the present invention, preferably, the measurement object includes a first measurement object that extends in a linear shape in a first direction and a second measurement object that extends in a linear shape in a second direction perpendicular to the first direction, the first measurement object and the second measurement object are adjacently arranged in a grid pattern, and the control unit sets an approximately planer region including the first measurement object and the second measurement object, and detects coordinates included in the region as coordinates of an intersection point of the measurement object and the measurement light.

According to the measurement apparatus with the present configuration, coordinates included in an approximately planer region including the linear first measurement object and the linear second measurement object arranged in a grid pattern are detected as coordinates of an intersection point but coordinates not included in the region are not detected as coordinates of an intersection point. Therefore, a structure other than the measurement object (for example, an uppermost rebar that is the measurement object and another rebar arranged below the uppermost rebar) is never detected as coordinates of an intersection point. Accordingly, only coordinates obtained from an intersection point with the measurement object can be reliably detected as the coordinates of the intersection point.

In the measurement apparatus according to the present invention, preferably, the control unit detects coordinates of a plurality of pairs of the intersection points by scanning the region with the measurement light in a plurality of circular scanned trajectories having different diameters.

According to the measurement apparatus with the present configuration, by scanning a region including the first measurement object and the second measurement object in a plurality of circular scanned trajectories having different diameters, coordinates of a plurality of intersection points of the measurement object included in this region and the measurement light can be detected in an efficient manner.

According to the present invention, the problem described above can be solved by a control method of a measurement apparatus which measures a distance to a measurement object, the measurement apparatus including: a distance measuring unit that includes a light producing element which produces measurement light; a measurement light emitting unit which emits the measurement light; a light receiving unit which receives reflected measurement light; and a light receiving element which receives the reflected measurement light and generates a light reception signal; and a deflecting unit which deflects a direction of emission of the measurement light with respect to a reference optical axis and which is capable of performing scanning with the measurement light with respect to a prescribed center in a circumferential direction, the control method including the steps of: measuring a distance to the measurement object on the basis of a light reception signal from the light receiving element; detecting coordinates of intersection points of the measurement object that is formed in a linear shape and a scanned trajectory with the measurement light on the basis of a distance measurement result of the step of measuring a distance and the direction of emission that is deflected by the deflecting unit; and identifying an array direction of the measurement object on the basis of coordinates of a plurality of the intersection points detected in the step of detecting coordinates of an intersection point.

According to the control method with the present configuration, coordinates of intersection points of a measurement object that is formed in a linear shape and a scanned trajectory with measurement light are detected in the step of detecting coordinates of an intersection point on the basis of a distance measurement result by the distance measuring unit and a direction of emission that is deflected by the deflecting unit. In addition, an array direction of the measurement object is identified in the step of identifying an array direction on the basis of coordinates of a plurality of the intersection points. Since the array direction of the measurement object is identified, a localized measurement of the measurement object can be executed in an efficient manner in the identified array direction.

According to the present invention, a measurement apparatus capable of identifying an array direction of a measurement object formed in a linear shape and efficiently performing a localized measurement of the measurement object without requiring a setting operation by a worker or a large processing load, and a control method of the measurement apparatus, can be provided.

DETAILED DESCRIPTION

First Embodiment

Figure 1:
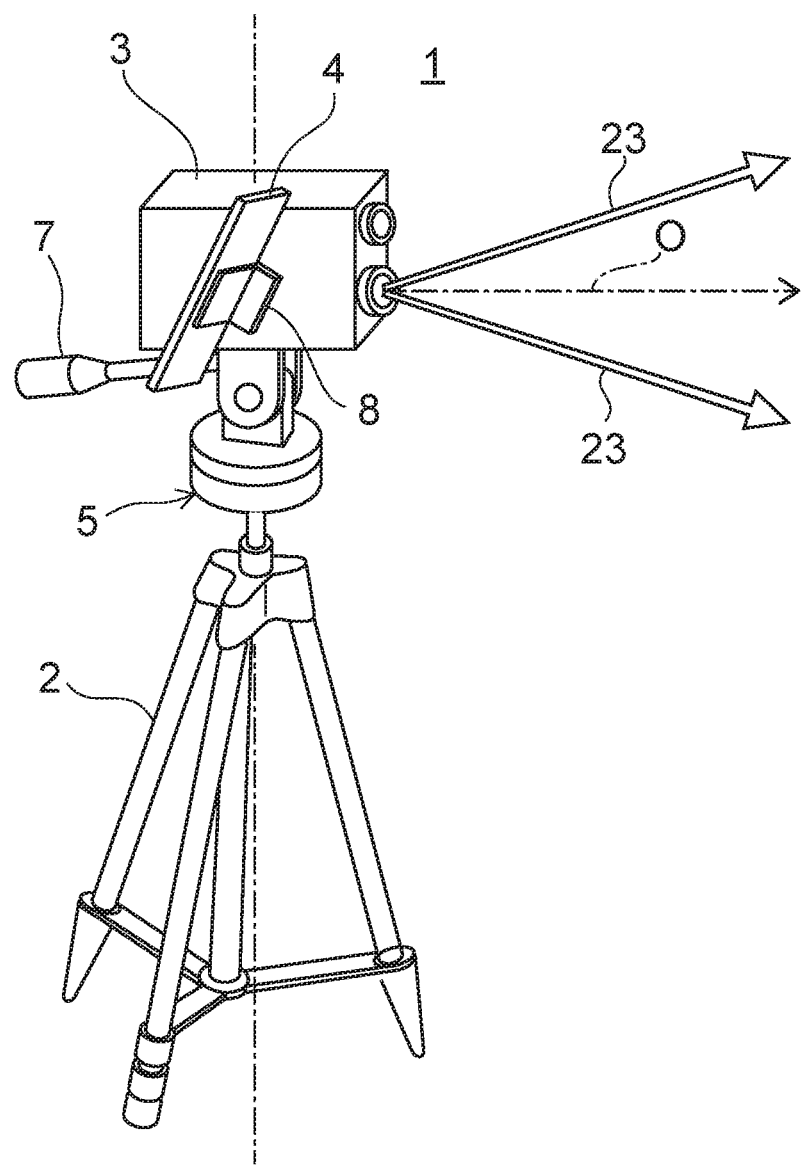
FIG. 1 is an external view of a measurement system equipped with a laser scanner according to a first embodiment of the present invention.

Hereinafter, a first embodiment of the present invention will be described with reference to the drawings. First, an outline of a measurement system (a measurement apparatus) equipped with a laser scanner according to the present embodiment will be provided with reference to FIG. 1. In FIG. 1, reference numeral 1 denotes a measurement system and reference character O denotes an optical axis in a state where the optical axis is not deflected by a deflecting unit 35 (to be described later), whereby the optical axis as this point will be used as a reference optical axis.

The measurement system 1 is mainly constituted by a tripod 2 as a supporting apparatus, a laser scanner 3, an operating apparatus 4, and a turntable 5. The turntable 5 is mounted to a top end of the tripod 2, and the laser scanner 3 is mounted to the turntable 5 so as to be laterally rotatable and vertically rotatable. In addition, the turntable 5 is equipped with a function of detecting a rotational angle in a lateral direction (a rotational angle in a horizontal direction) of the laser scanner 3.

The turntable 5 is provided with a lever 7 that extends in the lateral direction. By operating the lever 7, the laser scanner 3 can be rotated in an up-down direction (a vertical direction) or in the lateral direction (a horizontal direction) and can also be fixed at a necessary posture.

The laser scanner 3 has a built-in distance measuring unit 3A and a built-in posture detecting unit 17, and the distance measuring unit 3A performs a measurement by emitting measurement light 23 to a measurement object or a measurement range and receiving reflected measurement light 24. In addition, the posture detecting unit 17 is capable of detecting a posture of the laser scanner 3 with respect to vertical (or horizontal) with high accuracy.

The operating apparatus 4 has a communication function for communicating with the laser scanner 3 via necessary means such as wired or wireless means. In addition, the operating apparatus 4 is attachable to and detachable from the laser scanner 3 via an attachment 8, the detached operating apparatus 4 can be held and operated by one hand, and the laser scanner 3 can be remotely operated using the operating apparatus 4.

Furthermore, images, a measurement state, a measurement result, and the like are to be transmitted from the laser scanner 3 to the operating apparatus 4 to be stored in the operating apparatus 4 and displayed on a display unit (not shown) of the operating apparatus 4. For example, the operating apparatus 4 may be a smart phone.

Figure 2:
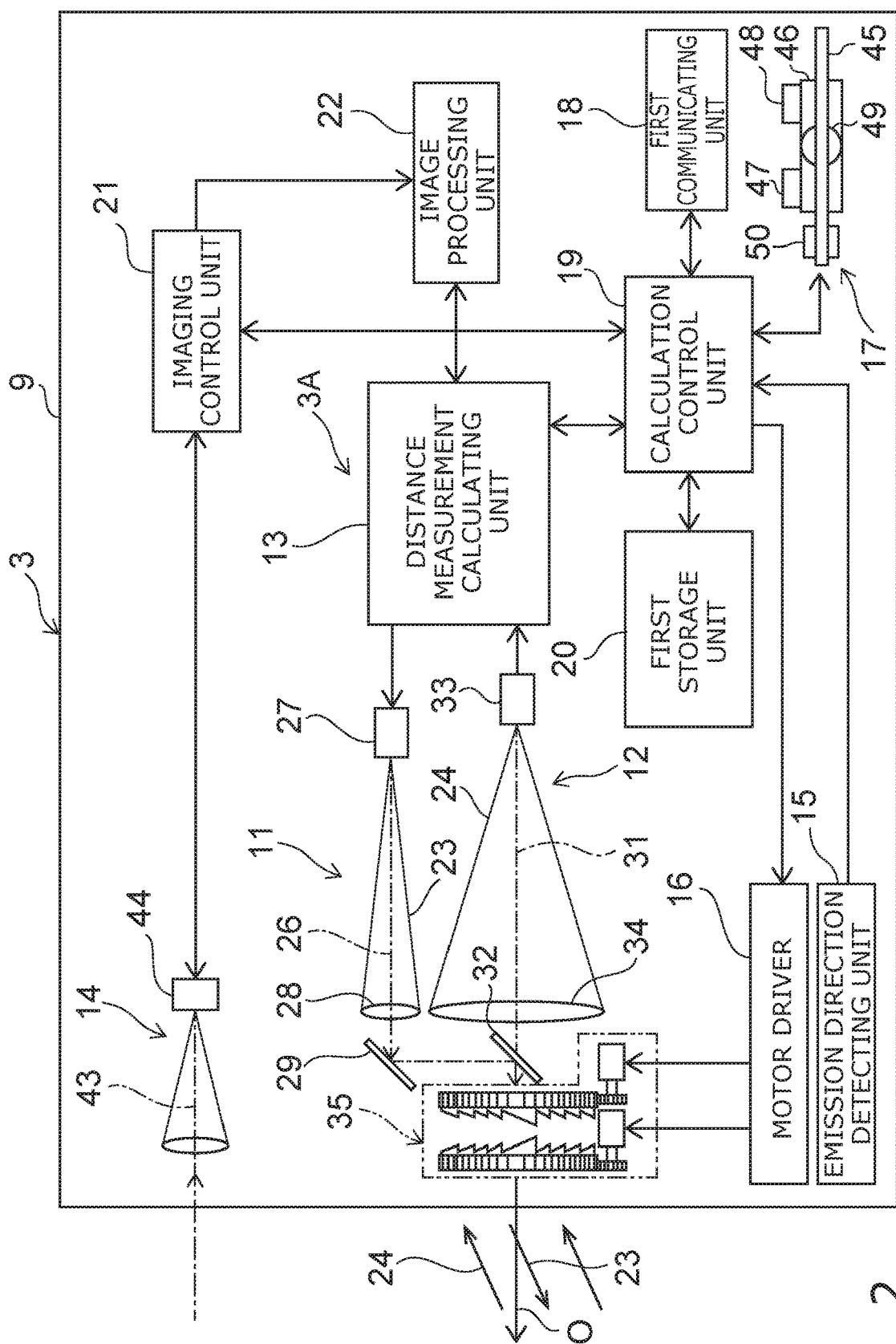
FIG. 2 is a schematic configuration diagram of the laser scanner shown in FIG. 1.

The laser scanner 3 will be described with reference to FIG. 2. The laser scanner 3 is equipped with a measurement light emitting unit 11, a light receiving unit 12, a distance measurement calculating unit 13, an imaging unit 14, an emission direction detecting unit 15, a motor driver 16, the posture detecting unit 17, a first communicating unit 18, a calculation control unit 19, a first storage unit 20, an imaging control unit 21, and an image processing unit 22, and the units are housed in an enclosure 9 and integrated with each other. It should be noted that the measurement light emitting unit 11, the light receiving unit 12, the distance measurement calculating unit 13, and the like constitute the distance measuring unit 3A.

The measurement light emitting unit 11 has an emission optical axis 26, and a light producing element 27 such as a laser diode (LD) is provided on the emission optical axis 26. In addition, a projection lens 28 is provided on the emission optical axis 26. Furthermore, a first reflecting mirror 29 as a deflecting optical member provided on the emission optical axis 26 and a second reflecting mirror 32 as a deflecting optical member provided on a reception optical axis 31 (to be described later) deflect the emission optical axis 26 so as to match the reception optical axis 31. The first reflecting mirror 29 and the second reflecting mirror 32 constitute an emission optical axis deflecting unit. The light producing element 27 produces a pulse laser beam, and the measurement light emitting unit 11 emits the pulse laser beam produced by the light producing element 27 as the measurement light 23.

The light receiving unit 12 will be described. Reflected measurement light 24 from a measurement object (in other words, a measurement point) is incident to the light receiving unit 12. The light receiving unit 12 has the reception optical axis 31 and, as described above, the emission optical axis 26 having been deflected by the first reflecting mirror 29 and the second reflecting mirror 32 matches the reception optical axis 31.

The deflecting unit 35 (to be described later) is arranged on the deflected emission optical axis 26 or, in other words, on the reception optical axis 31. A straight optical axis that passes through a center of the deflecting unit 35 constitutes the reference optical axis O. The reference optical axis O matches the emission optical axis 26 when not deflected by the deflecting unit 35 or the reception optical axis 31.

An imaging lens 34 and a light receiving element 33 such as a photodiode (PD) is arranged and provided on the incident reception optical axis 31 having passed through the deflecting unit 35. The imaging lens 34 focuses the reflected measurement light 24 on the light receiving element 33. The light receiving element 33 receives the reflected measurement light 24 and generates a light reception signal. The light reception signal is input to the distance measurement calculating unit 13. The distance measurement calculating unit 13 measures a distance to a measurement point on the basis of the light reception signal.

Figure 3:
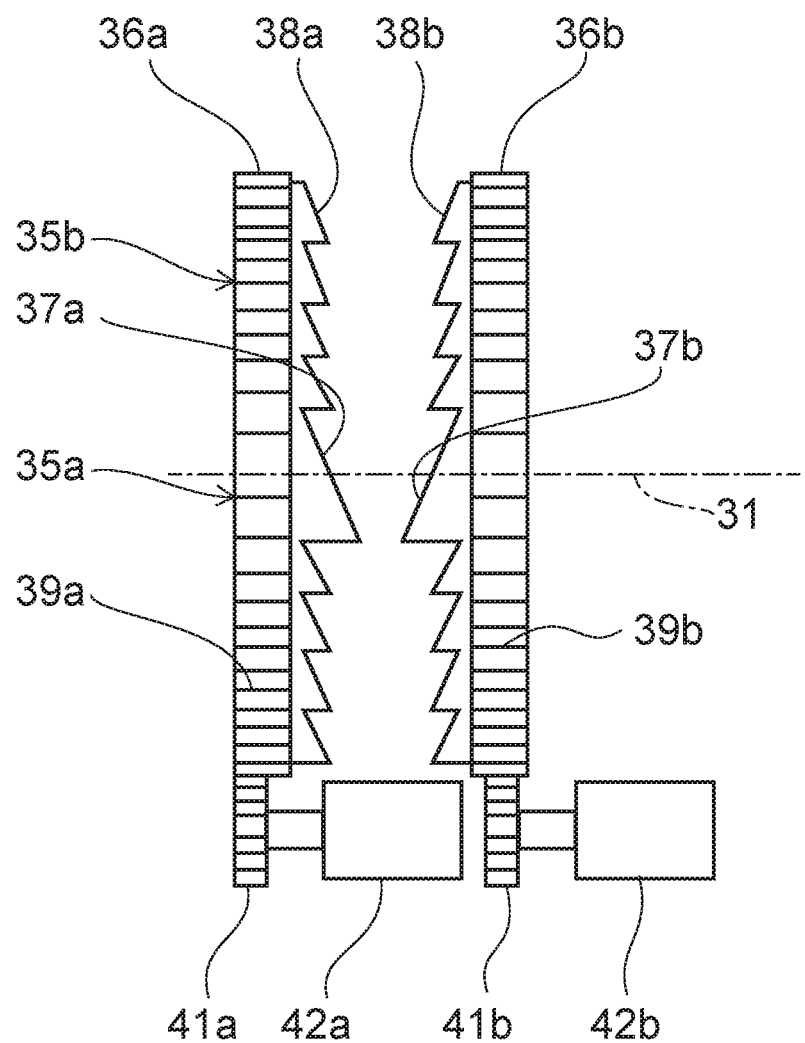
FIG. 3 is a schematic view of a deflecting unit in the laser scanner shown in FIG. 1.

The deflecting unit 35 will be described with reference to FIG. 3. The deflecting unit 35 is constituted by a pair of optical prisms 36a and 36b. The optical prisms 36a and 36b respectively have a disk shape and are orthogonally arranged on the reception optical axis 31 so as to overlap with, and in parallel to, each other. Using a Risley prism as each of the optical prisms 36a and 36b is preferable in terms of downsizing the apparatus. A center part of the deflecting unit 35 constitutes a measurement light deflecting unit 35a which is a first deflecting unit that transmits and emits the measurement light 23, and a portion excluding the center part constitutes a reflected measurement light deflecting unit 35b which is a second deflecting unit that transmits and emits the reflected measurement light 24.

The Risley prisms used as the optical prisms 36a and 36b are respectively constituted by prism elements 37a and 37b formed in parallel and a large number of prism elements 38a and 38b, and have a disk shape. The optical prisms 36a and 36b and the respective prism elements 37a, 37b and 38a, 38b have same optical characteristics.

The prism elements 37a and 37b constitute the measurement light deflecting unit 35a while the prism elements 38a and 38b constitute the reflected measurement light deflecting unit 35b. The Risley prisms may be manufactured of optical glass or molded from an optical plastic material. Molding the Risley prisms from an optical plastic material enables the Risley prisms to be inexpensively manufactured.

The optical prisms 36a and 36b are each arranged so as to be independently and individually rotatable around the reception optical axis 31. By independently controlling a rotational direction, a rotational amount, and a rotational speed of the optical prisms 36a and 36b, the measurement light 23 passing through the emission optical axis 26 is deflected in an arbitrary direction and the received reflected measurement light 24 is deflected so as to be parallel to the reception optical axis 31. An external shape of each of the optical prisms 36a and 36b is a circular shape centered on the reception optical axis 31, and diameters of the optical prisms 36a and 36b are set so as to enable a sufficient amount of light to be acquired in consideration of the spread of the reflected measurement light 24.

A ring gear 39a is fitted to an outer circumference of the optical prism 36a, and a ring gear 39b is fitted to an outer circumference of the optical prism 36b. A drive gear 41a meshes with the ring gear 39a, and the drive gear 41a is fastened to an output shaft of a motor 42a. In a similar manner, a drive gear 41b meshes with the ring gear 39b, and the drive gear 41b is fastened to an output shaft of a motor 42b. The motors 42a and 42b are electrically connected to the motor driver 16.

As the motors 42a and 42b, a motor capable of detecting an angle of rotation or a motor that produces rotation corresponding to a drive input value such as a pulse motor is used. Alternatively, a rotational amount of the motor may be detected using a rotational angle detector that detects a rotational amount (a rotational angle) of the motor such as an encoder. Rotational amounts of the motors 42a and 42b are respectively detected and the motors 42a and 42b are individually controlled by the motor driver 16. Alternatively, a configuration may be adopted in which encoders are respectively directly mounted to the ring gears 39a and 39b and the rotational angles of the ring gears 39a and 39b are directly detected by the encoders.

The drive gears 41a and 41b and the motors 42a and 42b are provided at positions where interference with the measurement light emitting unit 11 is prevented such as below the ring gears 39a and 39b.

The projection lens 28, the first reflecting mirror 29, the second reflecting mirror 32, the measurement light deflecting unit 35a, and the like constitute a projection optical system, and the reflected measurement light deflecting unit 35b, the imaging lens 34, and the like constitute a reception optical system.

The distance measurement calculating unit 13 controls the light producing element 27 and causes the light producing element 27 to produce a pulse laser beam as the measurement light 23. The measurement light 23 is deflected by the prism elements 37a and 37b (the measurement light deflecting unit 35a) so as to be directed toward a measurement point.

The reflected measurement light 24 reflected from the measurement object is incident to and received by the light receiving element 33 via the prism elements 38a and 38b (the reflected measurement light deflecting unit 35b) and the imaging lens 34. The light receiving element 33 sends a light reception signal to the distance measurement calculating unit 13, and on the basis of the light reception signal from the light receiving element 33, the distance measurement calculating unit 13 measures a distance to a measurement point (a point irradiated with the measurement light 23) for each pulse beam and stores distance measurement data in the first storage unit 20. In this manner, distance measurement data to each measurement point can be acquired by measuring a distance for each pulse beam while performing scanning with the measurement light 23.

The emission direction detecting unit 15 detects rotational angles of the motors 42a and 42b by counting drive pulses input to the motors 42a and 42b. Alternatively, the emission direction detecting unit 15 detects the rotational angles of the motors 42a and 42b on the basis of signals from encoders. In addition, the emission direction detecting unit 15 calculates rotational positions of the optical prisms 36a and 36b on the basis of the rotational angles of the motors 42a and 42b.

Furthermore, the emission direction detecting unit 15 calculates a direction of emission of the measurement light 23 on the basis of refractive indexes and rotational positions of the optical prisms 36a and 36b and inputs a calculation result to the calculation control unit 19. The calculation control unit 19 can obtain three-dimensional data of the measurement point by calculating a horizontal angle $\theta 1$ and a vertical angle $\theta 2$ of the measurement point relative to the reference optical axis O from the direction of emission of the measurement light 23 and associating the horizontal angle $\theta 1$ and the vertical angle $\theta 2$ with the distance measurement data for each measurement point.

The posture detecting unit 17 will be described. The posture detecting unit 17 has a frame 45, and the frame 45 is fixed to the enclosure 9 or to a structural member and integrated with the laser scanner 3. A sensor block 46 is mounted to the frame 45 via gimbals. The sensor block 46 is configured so as to be rotatable by 360 degrees around two orthogonal axes. A first inclination sensor 47 and a second inclination sensor 48 are mounted to the sensor block 46.

The first inclination sensor 47 detects horizontal at high accuracy and is constituted by, for example, an inclination detector that detects horizontal on the basis of a variation in a reflection angle of reflected light of detection light incident to a horizontal liquid surface or a bubble tube that detects an inclination on the basis of a positional variation of a bubble encapsulated therein. In addition, the second inclination sensor 48 detects an inclination variation with high responsiveness and is, for example, an acceleration sensor.

Relative rotational angles around the two axes of the sensor block 46 with respect to the frame 45 are detected by encoders 49 and 50. In addition, a motor (not shown) that rotates the sensor block 46 to keep the sensor block 46 horizontal is provided with respect to the two axes, and the motor is controlled by the calculation control unit 19 on the basis of detection results from the first inclination sensor 47 and the second inclination sensor 48 so as to keep the sensor block 46 horizontal.

When the sensor block 46 is inclined (when the laser scanner 3 is inclined), a relative rotational angle with respect to the sensor block 46 is detected by the encoders 49 and 50 and, on the basis of the detection results of the encoders 49 and 50, an inclination angle and an inclination direction of the laser scanner 3 are detected. Since the sensor block 46 is rotatable by 360 degrees around the two axes, regardless of what kind of posture is assumed by the posture detecting unit 17 (for example, even when top and bottom of the posture detecting unit 17 are reversed), posture detection can be performed in all directions.

Although posture detection and posture control are performed on the basis of a detection result of the second inclination sensor 48 when high responsiveness is required in the posture detection, generally, detection accuracy of the second inclination sensor 48 is lower than that of the first inclination sensor 47. With the posture detecting unit 17 equipped with the high-accuracy first inclination sensor 47 and the highly-responsive second inclination sensor 48, posture control is performed on the basis of a detection result of the second inclination sensor 48 while the first inclination sensor 47 enables posture detection with high accuracy.

A detection result of the second inclination sensor 48 can be calibrated by a detection result of the first inclination sensor 47. Specifically, when a deviation occurs between values of the encoders 49 and 50 when the first inclination sensor 47 detects horizontal or, in other words, an actual inclination angle and an inclination angle detected by the second inclination sensor 48, the inclination angle of the second inclination sensor 48 can be calibrated on the basis of the deviation.

Therefore, by acquiring, in advance, a relationship between a detected inclination angle of the second inclination sensor 48 and an inclination angle obtained on the basis of horizontal detection by the first inclination sensor 47 and detection results of the encoders 49 and 50, the inclination angle detected by the second inclination sensor 48 can be calibrated and accuracy of posture detection with high responsiveness by the second inclination sensor 48 can be improved.

When a variation in inclination is large or rapid, the calculation control unit 19 controls the motor on the basis of a signal from the second inclination sensor 48. In contrast, when a variation in inclination is small or gradual or, in other words, when the variation in inclination can be tracked by the first inclination sensor 47, the calculation control unit 19 controls the motor on the basis of a signal from the first inclination sensor 47.

The first storage unit 20 stores contrast data indicating a result of a comparison between a detection result of the first inclination sensor 47 and a detection result of the second inclination sensor 48. The detection result by the second inclination sensor 48 is calibrated on the basis of a signal from the second inclination sensor 48. Due to the calibration, a detection accuracy of the detection result of the second inclination sensor 48 can be raised to a detection accuracy of the first inclination sensor 47. Therefore, in posture detection by the posture detecting unit 17, high responsiveness can be realized while maintaining high accuracy.

The imaging unit 14 is a camera having an imaging optical axis 43 which is parallel to the reference optical axis O of the laser scanner 3 and an angle of view of, for example, 50 degrees, and acquires image data including a scanning range of the laser scanner 3. A relationship among the imaging optical axis 43, the emission optical axis 26, and the reference optical axis O is known. In addition, the imaging unit 14 is capable of acquiring moving images or continuous images.

The imaging control unit 21 controls imaging by the imaging unit 14. When the imaging unit 14 captures a moving image or a continuous image, the imaging control unit 21 synchronizes a timing of acquiring a frame image that constitutes the moving image or the continuous image and a timing of scanning with the laser scanner 3. The calculation control unit 19 also associates an image with point group data.

An imaging element 44 of the imaging unit 14 is a CCD or a CMOS sensor which is an aggregate of pixels, and a position of each pixel on an image element can be specified. For example, each pixel has pixel coordinates in a coordinate system of which an origin is the imaging optical axis 43, and the position of the pixel on an image element is specified by the pixel coordinates. The image processing unit 22 performs image processing for superimposing information to be displayed by the operating apparatus 4 on image data acquired by the imaging unit 14 and the like. An image generated by the image processing unit 22 is displayed on an operation screen of the operating apparatus 4 by the calculation control unit 19.

A measurement operation by the laser scanner 3 will now be described. The tripod 2 is installed at a known point or a prescribed point and the reference optical axis O is directed toward a measurement object. A horizontal angle of the reference optical axis O at this point is detected by the horizontal angle detection function of the turntable 5 and an inclination angle of the reference optical axis O relative to horizontal is detected by the posture detecting unit 17.

Figure 4:
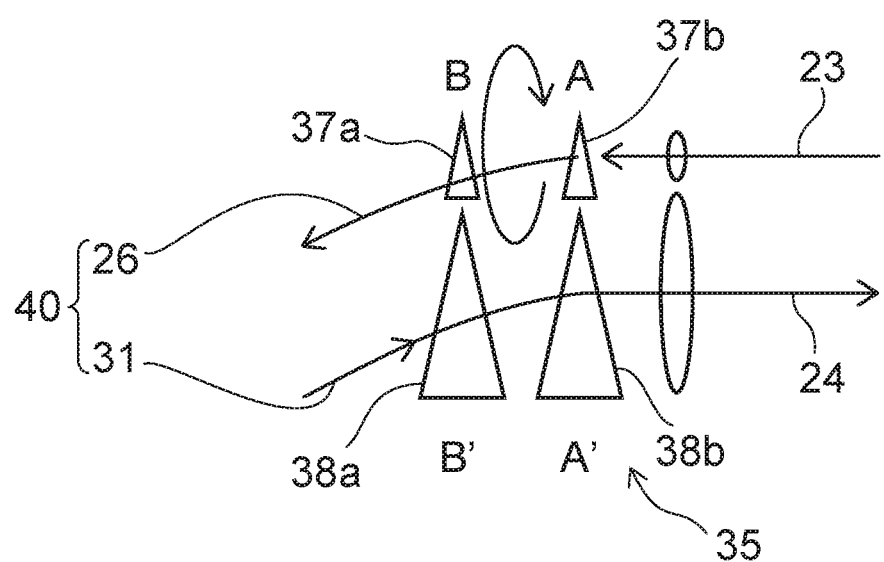
FIG. 4 is a diagram illustrating an action of the deflecting unit shown in FIG. 3.

A deflection operation and a scanning operation of the deflecting unit 35 will be described with reference to FIG. 4. In FIG. 4, for the sake of brevity, the prism elements 37*a* and 37*b* and the prism elements 38*a* and 38*b* are shown separated from each other in the optical prisms 36*a* and 36*b*. In addition, FIG. 4 shows a state where the prism elements 37*a* and 37*b* and the prism elements 38*a* and 38*b* are positioned in a same direction, and a maximum deflection angle is obtained in this state. A minimum deflection angle is obtained at a position where one of the optical prisms 36*a* and 36*b* has rotated by 180 degrees, in which case mutual optical actions of the optical prisms 36*a* and 36*b* cancel each other out to produce a deflection angle of 0 degrees. Therefore, the measurement light 23 emitted via the optical prisms 36*a* and 36*b* and the reflected measurement light 24 received via the optical prisms 36*a* and 36*b* match the reference optical axis O.

The measurement light 23 is produced by the light producing element 27, made into a parallel luminous flux by the projection lens 28, passes through the measurement light deflecting unit 35*a* (the prism elements 37*a* and 37*b*), and emitted toward the measurement object or a measurement range. By passing through the measurement light deflecting unit 35a, the measurement light 23 is deflected and emitted in a necessary direction by the prism elements 37a and 37b. The reflected measurement light 24 reflected by the measurement object or the measurement range passes through and is incident to the reflected measurement light deflecting unit 35b and is focused on the light receiving element 33 by the imaging lens 34.

By passing through the reflected measurement light 24 deflecting unit 35b, the reflected measurement light 24 is deflected by the prism elements 38a and 38b so as to match the reception optical axis 31 (FIG. 4). Due to a combination of rotational positions of the optical prism 36a and the optical prism 36b, a deflection direction and a deflection angle of the measurement light 23 to be emitted can be arbitrarily changed.

Therefore, by controlling the deflecting unit 35 while producing a laser beam with the light producing element 27, the calculation control unit 19 can perform scanning with the measurement light 23 in a circular trajectory. It is needless to say that the reflected measurement light deflecting unit 35b integrally rotates with the measurement light deflecting unit 35a.

Furthermore, by executing distance measurement while performing scans with the measurement light 23 by continuously varying the deflection angle of the deflecting unit 35, distance measurement data (scanned data) can be acquired along a scanned trajectory. In addition, with respect to scanning conditions determined by a scanning speed, a scanning density, and the like, the scanning speed is increased or reduced by increasing or reducing a rotational speed of the motors 42a and 42b while maintaining a relationship therebetween, and the scanning density can be set to a prescribed value by controlling a relationship between the scanning speed and a pulse emission period of the measurement light 23.

An emission direction angle of the measurement light 23 during measurement can be detected from rotational angles of the motors 42a and 42b, and three-dimensional distance measurement data can be acquired by associating the emission direction angle during measurement with distance measurement data. Therefore, the laser scanner 3 can be made to function as a laser scanner that acquires point group data having three-dimensional position data.

Next, a process of acquiring point group data of a measurement object by the measurement system 1 according to the present embodiment will be described. The measurement objects according to the present embodiment are rebars 100 which are iron rod members formed so as to extend in a linear shape. The measurement system 1 according to the present embodiment does not cause the first storage unit 20 to store measurement results of an entire field of view including the rebars 100 but causes the first storage unit 20 to only store measurement results of a portion of the rebars 100.

Figure 5:
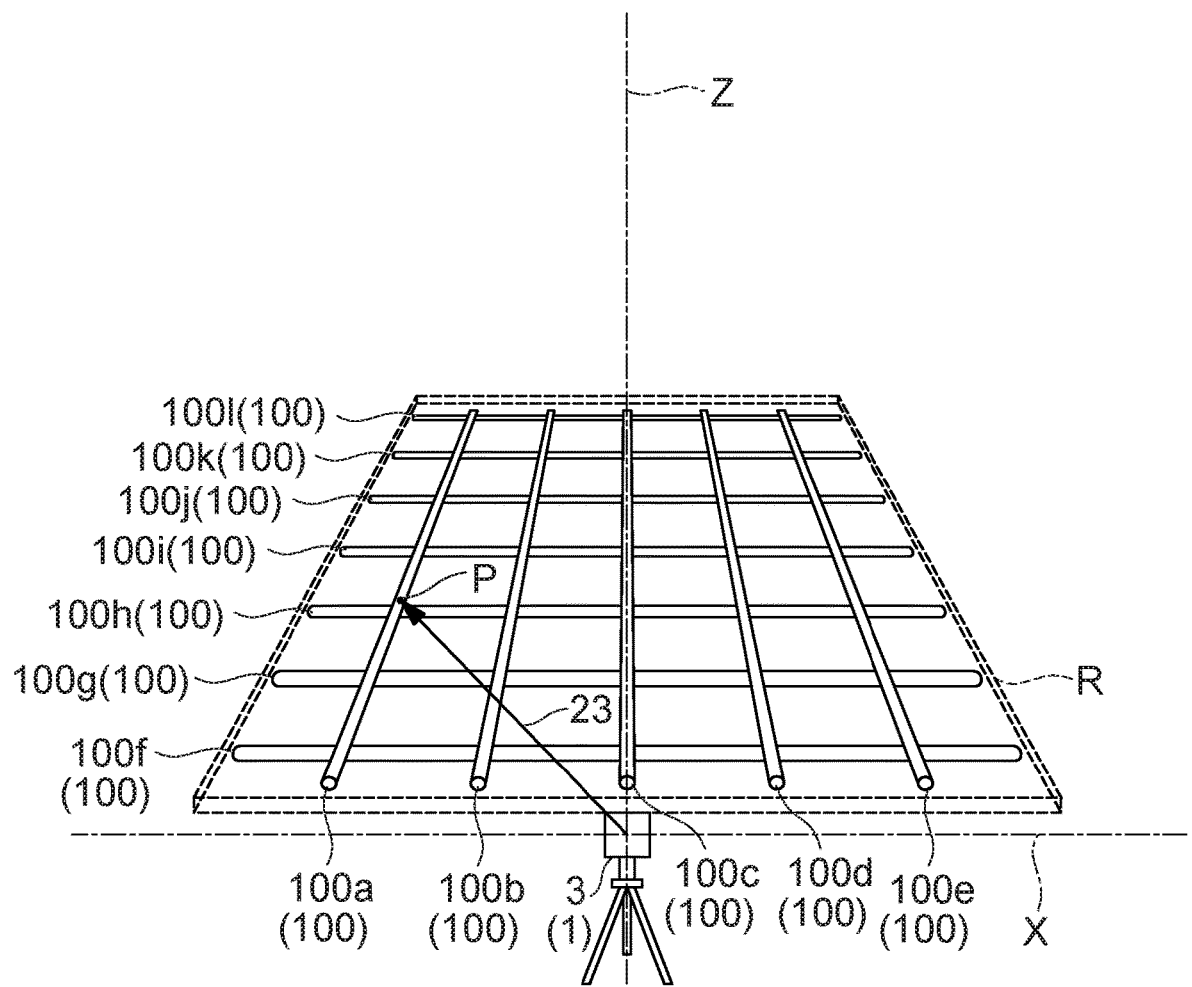
FIG. 5 is an X-Z plan view in which rebars are viewed along a reference optical axis.
Figure 6:
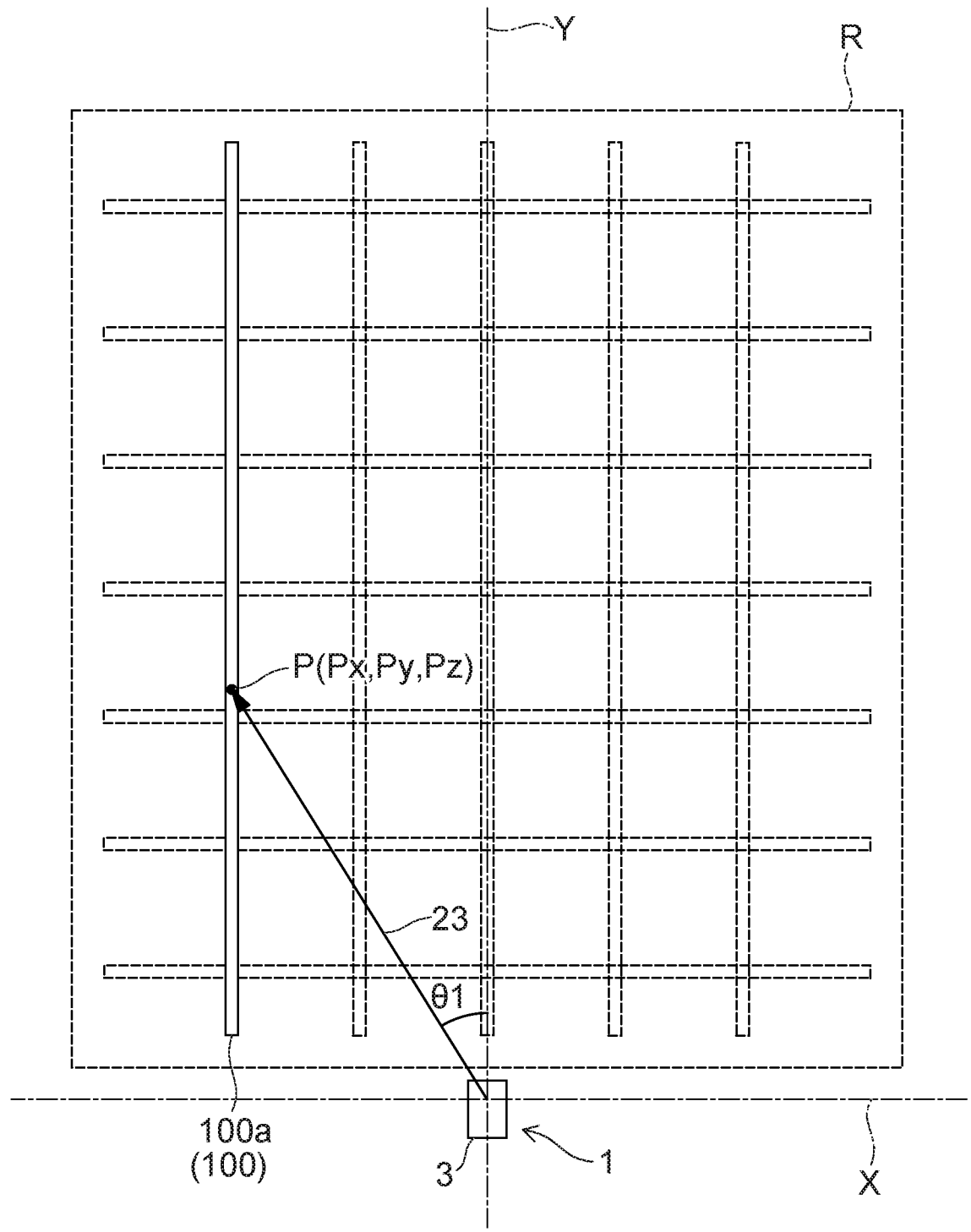
FIG. 6 is an X-Y plan view in which the rebars and the measurement system are viewed from above.
Figure 7:
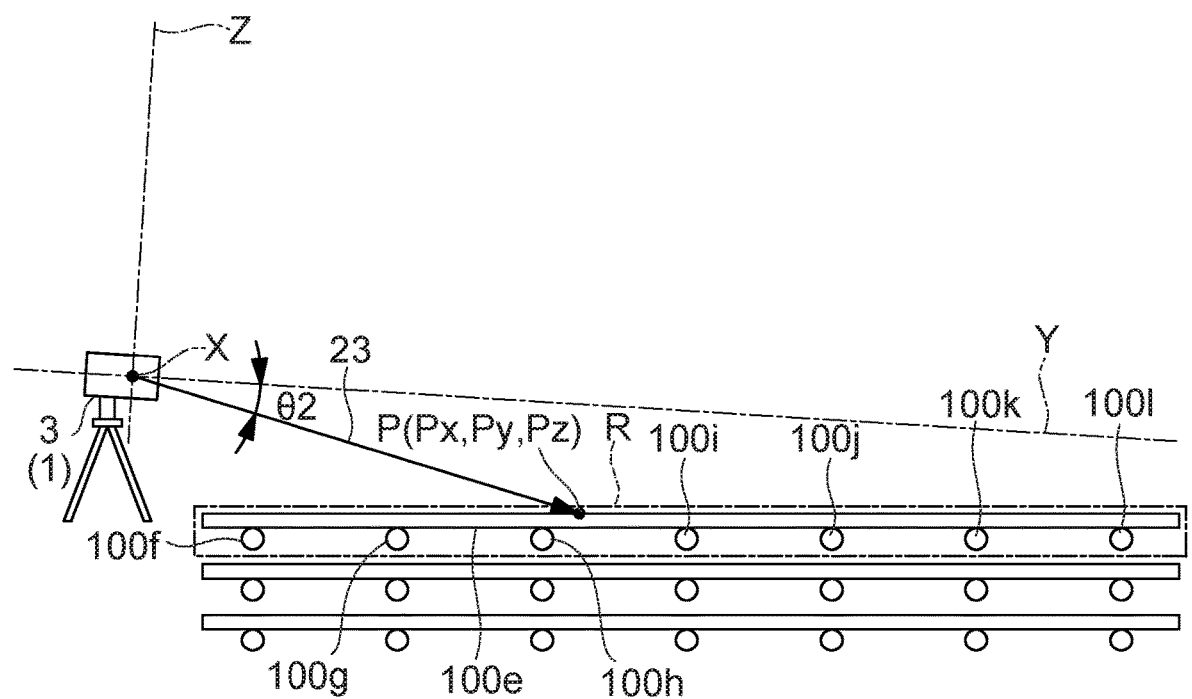
FIG. 7 is a Y-Z plan view in which the rebars and the measurement system are viewed from the side.

FIG. 5 is an X-Z plan view in which the rebars 100 are viewed along the reference optical axis O. FIG. 6 is an X-Y plan view in which the rebars 100 and the measurement system 1 are viewed from above. FIG. 7 is a Y-Z plan view in which the rebars 100 and the measurement system 1 are viewed from the side. The rebars 100 include rebars 100a, 100b, 100c, 100d, and 100e (first rebars) which extend in a linear shape in a first direction (a depth direction in FIG. 5) and rebars 100f, 100g, 100h, 100i, 100j, 100k, and 100l (second rebars) which extend in a linear shape in a second direction (a horizontal direction in FIG. 5). The first rebars 100 and the second rebars 100 are adjacently arranged in a grid pattern.

As shown in FIG. 5, the plurality of rebars 100 (100a, 100b, 100c, 100d, and 100e) which extend in the first direction are arranged parallel to each other at intervals in the second direction that is perpendicular to the first direction. The plurality of rebars 100 (100f, 100g, 100h, 100i, 100j, 100k, and 100l) which extend in the second direction are arranged parallel to each other at intervals in the first direction. The plurality of rebars 100 which extend in the first direction and the plurality of rebars 100 which extend in the second direction are adjacently arranged in a grid pattern.

In FIGS. 5 to 7, an axis X, an axis Y, and an axis Z are axes that pass a reference point of measurement of the laser scanner 3 of the measurement system 1. The axis Y is an axis that matches the reference optical axis O of the laser scanner 3. The axes X and Z are axes orthogonal to each other at the reference point and respectively orthogonal to the axis Y. A position P (Px, Py, Pz) in a three-dimensional space defined by the axis X, the axis Y, and the axis Z represents coordinates with the laser scanner 3 as a reference.

As described earlier, a horizontal angle (an inclination angle relative to a horizontal plane) of the axis Y can be detected by the posture detecting unit 17. Therefore, by correcting the position P (Px, Py, Pz) on the basis of the horizontal angle detected by the posture detecting unit 17, the calculation control unit 19 can calculate a position with the horizontal plane as a reference. Alternatively, the measurement system 1 according to the present embodiment may not include the posture detecting unit 17. Even if the measurement system 1 does not include the posture detecting unit 17 and calculates a position with the horizontal plane as a reference, coordinates of the rebars 100 in a three-dimensional space defined by the axis X, the axis Y, and the axis Z can be detected and an arrangement state (direction of rebars, intervals, and the like) of the rebars 100 can be detected.

In FIGS. 5 to 7, the measurement light 23 is deflected by the deflecting unit 35 so as to pass the position P (Px, Py, Pz) on the rebar 100a. Px denotes a coordinate of the position P on the axis X, Py denotes a coordinate of the position P on the axis Y, and Pz denotes a coordinate of the position P on the axis Z.

As shown in FIG. 6, on an X-Y plane (a plane on which the axis X and the axis Y are arranged), an angle formed by the axis Y and the direction of emission of the measurement light 23 on the X-Y plane is a horizontal angle θ1. As shown in FIG. 7, on a Y-Z plane (a plane on which the axis Y and the axis Z are arranged), an angle formed by the axis Y and the measurement light 23 on the Y-Z plane is a vertical angle θ2. The emission direction detecting unit 15 calculates the horizontal angle θ1 and the vertical angle θ2 which indicate the direction of emission of the measurement light 23 on the basis of refractive indexes and rotational positions of the optical prisms 36a and 36b.

Figure 8:
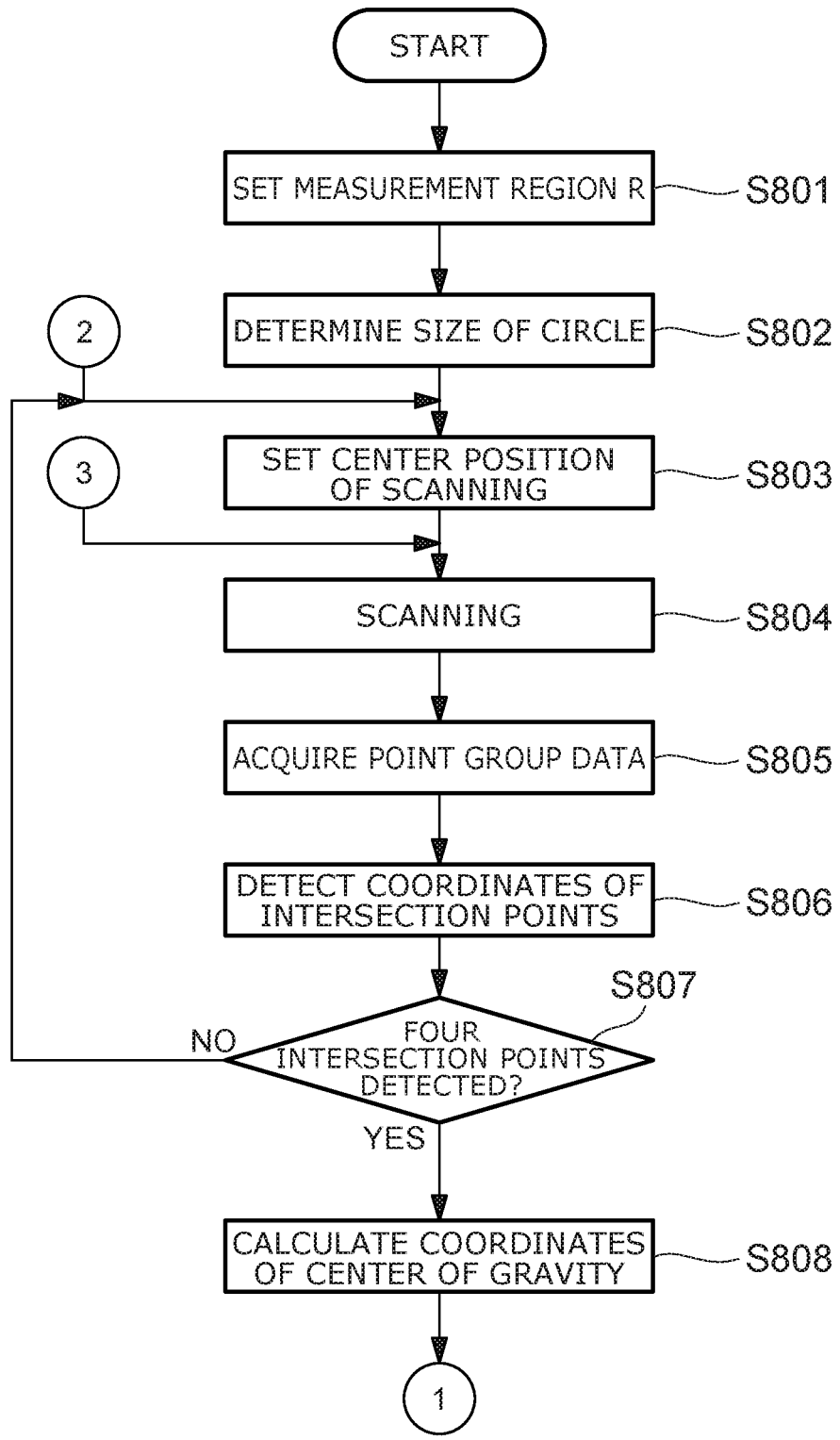
FIG. 8 is a flow chart showing processes executed by a calculation control unit.
Figure 9:
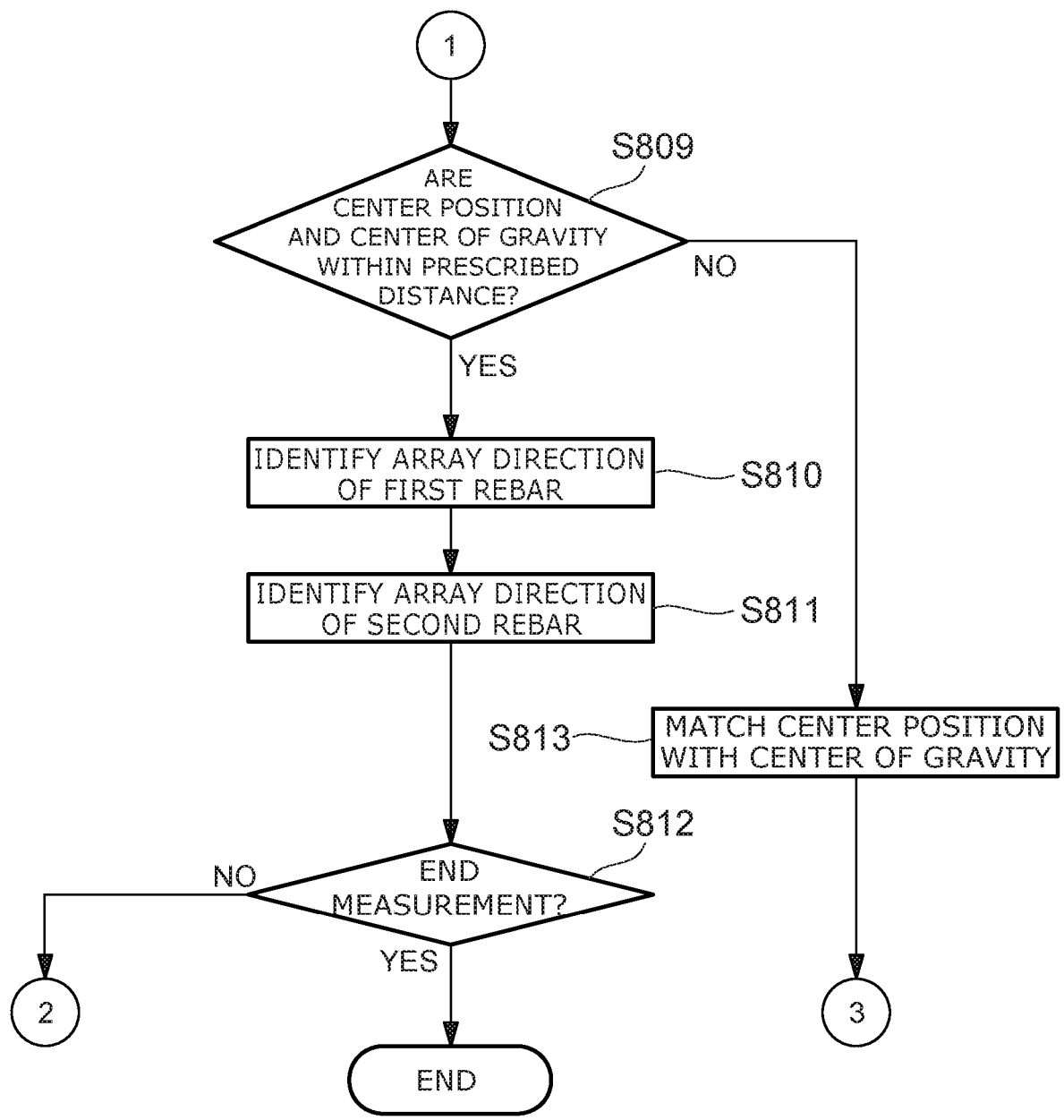
FIG. 9 is a flow chart showing processes executed by the calculation control unit.

Next, processes executed by the calculation control unit 19 will be described with reference to FIGS. 8 and 9. FIGS. 8 and 9 are flow charts showing the processes executed by the calculation control unit 19. For example, the calculation control unit 19 is constituted by a central processing unit (CPU), a random access memory (RAM), a read only memory (ROM), a computer-readable storage medium, and the like. In addition, for example, a series of processes for realizing various functions are stored in a program format in the storage medium or the like, in which case the various functions are realized by having the CPU read the program to the RAM or the like and execute information processing and information calculation processes.

In step S801, the calculation control unit 19 sets a measurement region R. The measurement region R is a region set in order to narrow down coordinates to be detected as coordinates of intersection points of the rebars 100 and scanned trajectories with the measurement light 23. For example, as shown in FIG. 7, the measurement region R is set so that only the rebars 100 arranged in an uppermost layer among the rebars arranged and stacked in a plurality of tiers are detected as coordinates. The measurement region R is an approximately planer region including the rebars 100a, 100b, 100c, 100d, and 100e (first measurement objects) and the rebars 100f, 100g, 100h, 100i, 100j, 100k, and 1001 (second measurement objects).

For example, the measurement region R is set by an operator of the measurement system 1 by specifying four points in a three-dimensional space. Alternatively, a position where two perpendicular rebars (for example, the rebar 100a and the rebar 100g) intersect each other may be scanned and four intersection points may be detected, whereby the measurement region R may be set so as to include coordinates of the intersection points.

In step S802, the calculation control unit 19 determines a size of a circle of the measurement light 23 that irradiates the measurement region R during scanning. The calculation control unit 19 determines the size of the circle so that a diameter of the circle ranges from approximately 0.5 times to 0.8 times of the intervals of the rebars set in advance. In this case, the intervals of the rebars set in advance are the intervals of the rebars 100a, 100b, 100c, 100d, and 100e arranged approximately parallel to each other or the intervals of the rebars 100f, 100g, 100h, 100i, 100j, 100k, and 1001 arranged approximately parallel to each other.

In step S803, the calculation control unit 19 sets a center position Pc of scanning at a prescribed position such as a position closest to the laser scanner 3 in the measurement region R set in step S801. The prescribed position may be a position determined in advance or a position designated by the operator via an operation screen of the operating apparatus 4. The calculation control unit 19 calculates the horizontal angle θ1 and the vertical angle θ2 of a measurement point relative to the reference optical axis O so as to perform scanning around the set center position Pc. In this case, scanning refers to an operation of scanning with respect to the prescribed center position Pc in a circumferential direction by one rotation with the measurement light 23.

In step S804, the calculation control unit 19 performs scanning on the basis of the horizontal angle θ1 and the vertical angle θ2 calculated in step S803 or step S813. At this point, by rotating the optical prism 36a and the optical prism 36b so as to assume rotational positions in accordance with the horizontal angle θ1 and the vertical angle θ2, the calculation control unit 19 performs scanning with the measurement light 23 with respect to the prescribed center position Pc by one rotation in the circumferential direction. The distance measurement calculating unit 13 measures a distance to the measurement point for each of a plurality of pulses included in the measurement light 23 on the basis of a light reception signal from the light receiving element 33 with respect to the measurement light 23. The calculation control unit 19 stores distance measurement data obtained by distance measurement by the distance measurement calculating unit 13 in the first storage unit 20.

Figure 10:
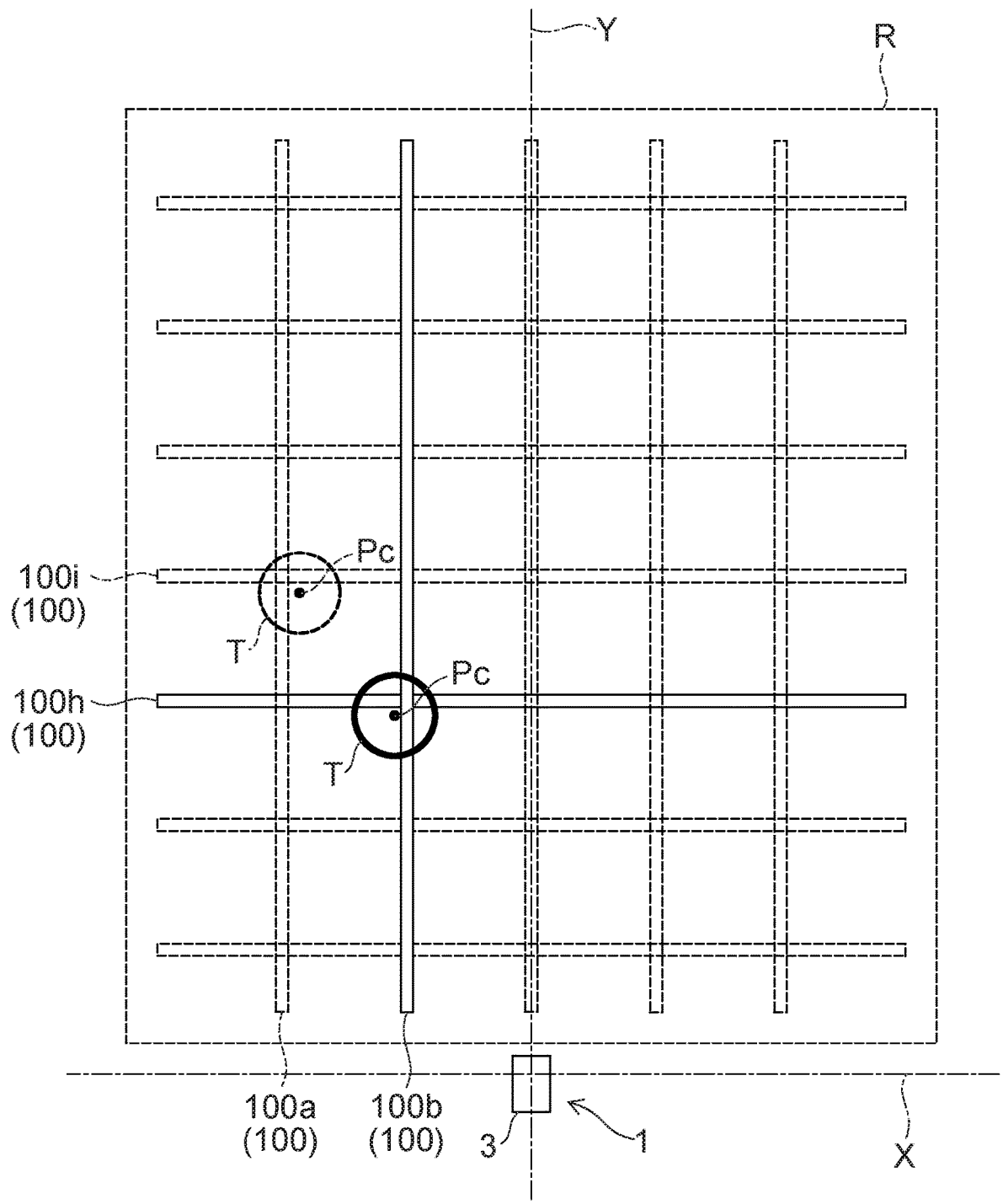
FIG. 10 is an X-Y plan view showing a state where intersection points of rebars are scanned.
Figure 11:
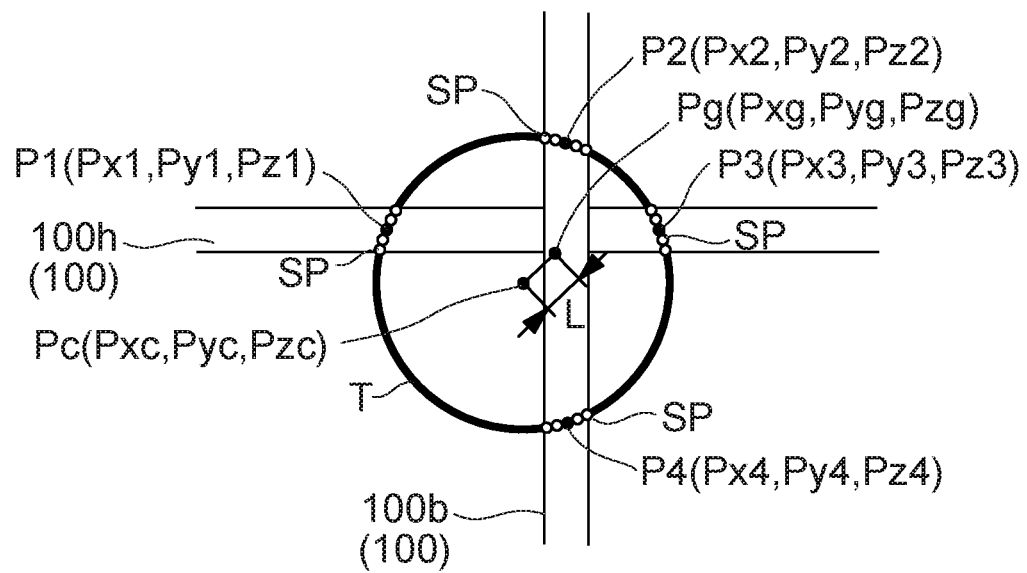
FIG. 11 is a partial enlarged view showing a vicinity of an intersection point of rebars.
Figure 12:
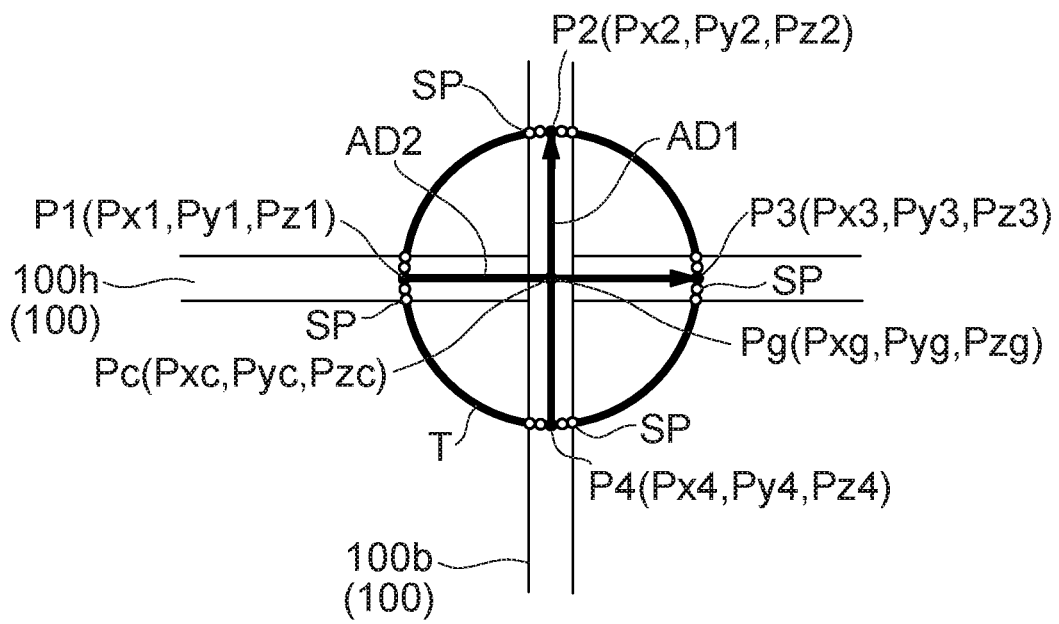
FIG. 12 is a partial enlarged view showing a vicinity of an intersection point of rebars.

FIG. 10 is a diagram showing a state where an intersection point of the rebar 100b and the rebar 100h is scanned. FIGS. 11 and 12 are partial enlarged views showing a vicinity of the intersection point of the rebar 100b and the rebar 100h. In FIGS. 10 to 12, a reference character Pc denotes a position of a center position of scanning. A reference character T denotes a trajectory of scanning performed around the center position Pc with the measurement light 23. A reference character SP in FIGS. 11 and 12 denotes a plurality of measurement points by the pulsed measurement light 23.

As shown in FIG. 11, when the intersection point of the rebar 100b and the rebar 100h is scanned along the circular scanned trajectory T around the prescribed center position Pc (Pxc, Pyc, Pzc), the scanned trajectory T with the measurement light 23 and the rebar 100b intersect each other at two locations. In addition, the scanned trajectory T with the measurement light 23 and the rebar 100h intersect each other at two locations. The measurement light 23 from the rebar 100b and the rebar 100h is reflected at the plurality of measurement points SP and received by the light receiving element 33.

In step S805, on the basis of the horizontal angle θ1 and the vertical angle θ2 of the measurement light 23 calculated in step S803 or S813 and distance measurement data of the plurality of measurement points SP stored in the first storage unit 20, the calculation control unit 19 acquires point group data that is an aggregate of three-dimensional coordinates of the plurality of measurement points SP. Specifically, the calculation control unit 19 acquires point group data by associating the horizontal angle θ1 and the vertical angle θ2 of the measurement light 23 with the distance measurement data of each measurement point SP. The calculation control unit 19 stores the acquired point group data in the first storage unit 20.

In step S806, the calculation control unit 19 detects coordinates of an intersection point P2 and an intersection point P4 which indicate positions where the scanned trajectory T with the measurement light 23 and the rebar 100b intersect each other from the point group data stored in the first storage unit 20 in step S805. The intersection point P2 and the intersection point P4 are arranged above and below the center position Pc in FIG. 11. For example, the calculation control unit 19 obtains coordinates of the intersection point P4 below the center position Pc by calculating an average value of coordinates of point group data of a plurality of points below the center position Pc. In addition, for example, the calculation control unit 19 obtains coordinates of the intersection point P2 above the center position Pc by calculating an average value of coordinates of point group data of a plurality of points above the center position Pc.

In addition, the calculation control unit 19 detects coordinates of an intersection point P1 and an intersection point P3 which indicate positions where the scanned trajectory T with the measurement light 23 and the rebar 100h intersect each other from the point group data stored in the first storage unit 20 in step S805. The intersection point P1 and the intersection point P3 are arranged to the left and to the right of the center position Pc in FIG. 11. For example, the calculation control unit 19 obtains coordinates of the intersection point P1 to the left of the center position Pc by calculating an average value of coordinates of point group data of a plurality of points to the left of the center position Pc. In addition, for example, the calculation control unit 19 obtains coordinates of the intersection point P3 to the right of the center position Pc by calculating an average value of coordinates of point group data of a plurality of points to the right of the center position Pc.

While the coordinates of the intersection point P1, the intersection point P2, the intersection point P3, and the intersection point P4 are obtained by calculating an average value of coordinates of a plurality of pieces of point group data, other modes may be adopted instead. For example, light reception intensity by the light receiving element 33 of the reflected measurement light 24 which corresponds to each piece of point group data may be stored together with coordinates of a plurality of pieces of point group data, and point group data with highest light reception intensity among the plurality of pieces of point group data may be adopted as the coordinates of an intersection point.

In addition, when detecting coordinates of intersection points in step S806, the calculation control unit 19 excludes coordinates of intersection points that are not included in the measurement region R set in step S801. This enables the calculation control unit 19 to detect coordinates included in the measurement region R as coordinates of intersection points of the rebars 100 and scanned trajectories with the measurement light 23. Accordingly, point group data and the like obtained from other rebars or the ground which are not measurement objects can be excluded from coordinates of intersection points.

In step S807, the calculation control unit 19 determines whether or not coordinates of the four intersection points P1, P2, P3, and P4 have been detected in step S806, and when a positive determination is made (YES in S807), the calculation control unit 19 advances the process to step S808 but when a negative determination is made (NO in S807), the calculation control unit 19 once again executes step S803. When the calculation control unit 19 executes step S803 after making a negative determination, the calculation control unit 19 moves the center position of the scanning in an arbitrary direction. This is done because, by moving the center position of the scanning in an arbitrary direction, a region around an intersection point of two rebars 100 can be scanned and coordinates of four intersection points can be detected.

In step S808, the calculation control unit 19 calculates coordinates of a center of gravity Pg of the coordinates of the four intersection points detected in step S807. The coordinates of the center of gravity Pg are calculated in order to match the center position of the scanning with an intersection point of the rebar 100$b$ and the rebar 100$h$. The coordinates (Pxg, Pyg, Pzg) of the center of gravity Pg are calculated by equations (1) to (3) below on the basis of coordinates (Px1, Py1, Pz1) of the intersection point P1, coordinates (Px2, Py2, Pz2) of the intersection point P2, coordinates (Px3, Py3, Pz3) of the intersection point P3, and coordinates (Px4, Py4, Pz4) of the intersection point P4.

$$Pxg=(Px1+Px2+Px3+Px4)/4 \quad (1)$$

$$Pyg=(Py1+Py2+Py3+Py4)/4 \quad (2)$$

$$Pzg=(Pz1+Pz2+Pz3+Pz4)/4 \quad (3)$$

In step S809, the calculation control unit 19 determines whether or not a distance L between the center position Pc set in step S803 and the center of gravity Pg calculated in step S808 is within a prescribed distance, and when a positive determination is made (YES in S809), the calculation control unit 19 advances the process to step S810 but when a negative determination is made (NO in S809), the calculation control unit 19 advances the process to step S813. For example, the prescribed distance is a length corresponding to around 10% to 30% of a size of a circle of the scanned trajectory T.

In step S813, since the distance L between the center position Pc set in step S803 and the center of gravity Pg calculated in step S808 is longer than the prescribed distance, the calculation control unit 19 sets the center position Pc of the scanning so that the center position Pc matches the center of gravity Pg. The calculation control unit 19 calculates the horizontal angle θ1 and the vertical angle θ2 of a measurement point relative to the reference optical axis O so as to perform scanning around the set center position Pc. The calculation control unit 19 repetitively executes the processes of step S809 and step S813 and controls a deflection operation of the deflecting unit 35 so that the center position Pc of the scanning is arranged at an intersection position where the first rebars 100 and the second rebars 100 intersect each other.

FIG. 12 shows a state where the center position Pc of the scanning is arranged at an intersection position where the first rebar 100 and the second rebar 100 intersect each other. As shown in FIG. 12, when the distance between the center of gravity Pg and the center position Pc is equal to or shorter than the prescribed distance, a state is created where the center position Pc of the scanning is arranged at an intersection position where the first rebar 100 and the second rebar 100 intersect each other.

In step S810, the calculation control unit 19 identifies an array direction AD1 of the rebar 100$b$ (the first rebar) which extends in a linear shape in a first direction (the depth direction in FIG. 5) on the basis of the coordinates (Px2, Py2, Pz2) of the intersection point P2 and the coordinates (Px4, Py4, Pz4) of the intersection point P4 detected in step S806. The calculation control unit 19 identifies a vector that connects the intersection point P4 and the intersection point P2 as the array direction AD1. The array direction AD1 indicates a direction in which the rebar 100$b$ is arranged, and it is estimated that the rebar 100$b$ is arranged on an extension of the array direction AD1.

In step S811, the calculation control unit 19 identifies an array direction AD2 of the rebar 100$h$ (the second rebar) which extends in a linear shape in a second direction (the horizontal direction in FIG. 5) on the basis of the coordinates (Px1, Py1, Pz1) of the intersection point P1 and the coordinates (Px3, Py3, Pz3) of the intersection point P3 detected in step S806. The calculation control unit 19 identifies a vector that connects the intersection point P1 and the intersection point P3 as the array direction AD2. The array direction AD2 indicates a direction in which the rebar 100$h$ is arranged, and it is estimated that the rebar 100$h$ is arranged on an extension of the array direction AD2.

In step S812, the calculation control unit 19 determines whether or not the measurement for identifying the array direction of the rebars 100 is to be ended, and when a positive determination is made (YES in S812), the calculation control unit 19 ends the processes of the present flow chart, but when a negative determination is made (NO in S812), the calculation control unit 19 once again executes the processes of step S803 and thereafter. When the calculation control unit 19 executes step S803 after making a negative determination, the calculation control unit 19 moves the center position of the scanning in an arbitrary direction.

The center position Pc of the scanning is moved in an arbitrary direction in order to identify an array direction of another rebar 100 which differs from the rebar 100$b$ and rebar 100$h$ of which an array direction has already been identified. For example, the calculation control unit 19 moves the center position Pc of the scanning so as to assume the scanned trajectory T that encloses an intersection point of the rebar 100a and the rebar 100i as indicated by a dash line in FIG. 10. By repeating such processes, a plurality of intersection points where the first rebars 100 and the second rebars 100 intersect each other can be detected and the array direction of the rebars 100 at each intersection point can be identified.

Figure 13:
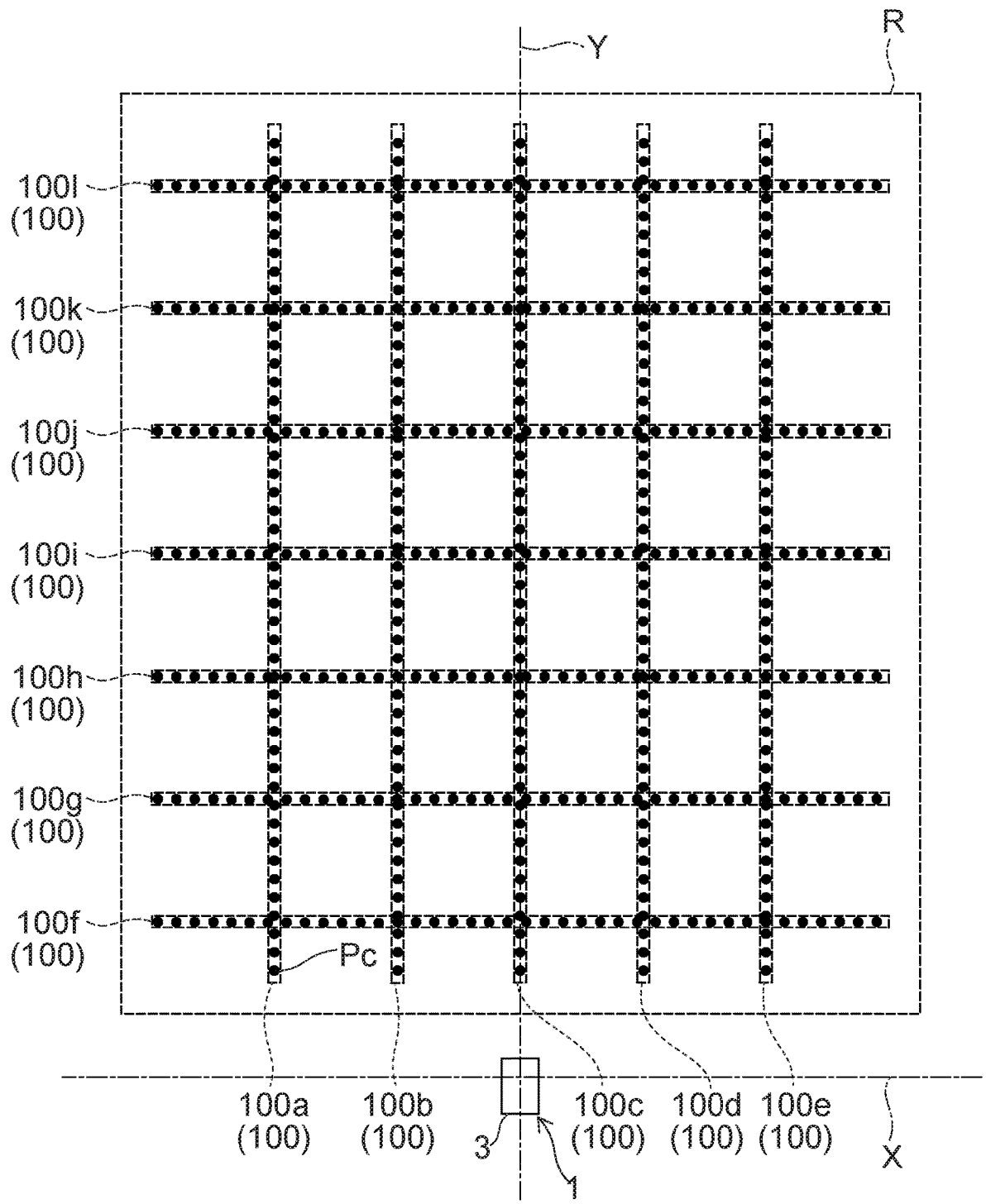
FIG. 13 is an X-Y plan view showing array directions of rebars.

FIG. 13 is an X-Y plan view showing array directions of the rebars 100. The rebars 100a to 100l indicated by dash lines in FIG. 13 are a region set on the basis of the array directions of the rebars 100 identified by the process of identifying the array direction of the rebars 100 shown in FIGS. 8 and 9 and is a region where it is estimated that the rebars 100 are to be arranged. The calculation control unit 19 controls a deflection operation of the deflecting unit 35 so that the center position Pc of the scanning moves at prescribed intervals (for example, regular intervals in a three-dimensional space defined by the axis X, the axis Y, and the axis Z) in the region where it is estimated that the rebars 100 are to be arranged.

The center position Pc shown in FIG. 13 indicates a center position of scanning when the measurement system 1 scans the region where it is estimated that the rebars 100 are to be arranged. The calculation control unit 19 scans the rebars 100 with the measurement light 23 in a state where the center position Pc is set and acquires point group data, calculates an average value of coordinates of the point group data, and detects coordinates of intersection points of the scanned trajectory T with the measurement light 23 and the rebars 100.

By performing scanning with respect to each center position Pc shown in FIG. 13, the calculation control unit 19 can detect coordinates of intersection points of the rebars 100a to 100l and the scanned trajectory T with the measurement light 23. Since the array direction of the plurality of rebars 100 shown in FIGS. 8 and 9 is identified in advance by the process of identifying the array direction of the rebars 100, by moving the center position Pc of the scanning in the identified array direction, the plurality of rebars 100 can be reliably measured. The center position Pc of the scanning may be moved above the rebars 100 in the identified array direction or moved between the plurality of rebars 100 in the identified array direction. In the example represented in FIG. 13, the center position Pc of the scanning is moved above the rebars 100 in the identified array direction.

Operational advantages of the measurement system 1 according to the present embodiment described above will now be described. With the measurement system 1 according to the present configuration, coordinates of intersection points of the rebars 100 which are formed in a linear shape and the scanned trajectory T with the measurement light 23 are detected by the calculation control unit 19 on the basis of a distance measurement result by the distance measuring unit 3A and a direction of emission that is deflected by the deflecting unit 35. In addition, the calculation control unit 19 identifies array directions AD1 and AD2 of the rebars 100 on the basis of coordinates of a plurality of the intersection points. Since the array directions AD1 and AD2 of the rebars 100 are identified, a localized measurement of the rebars 100 can be executed in an efficient manner in the identified array directions AD1 and AD2.

In addition, with the measurement system 1 according to the present configuration, by arranging the prescribed center position Pc of the scanned trajectory T with the measurement light 23 at an intersection position where the first rebar 100 that extends in a linear shape and the second rebar 100 that extends in a linear shape in a direction perpendicular to the first rebar 100, coordinates of two pairs of intersection points arranged at point-symmetric positions with respect to the prescribed center position Pc are detected. Furthermore, the array direction AD1 of the first rebar 100 and the array direction AD2 of the second rebar 100 can be simultaneously identified on the basis of the coordinates of one of the two pairs of intersection points and the coordinates of the other pair of intersection points.

Moreover, with the measurement system 1 according to the present embodiment, when four intersection points are detected, by matching the center of gravity Pg of the intersection points with the center position Pc of the scanned trajectory T with the measurement light 23, coordinates of two pairs of intersection points arranged at point-symmetric positions with respect to the prescribed center position Pc can be reliably detected.

Second Embodiment

Next, a measurement system according to a second embodiment of the present invention will be described. The measurement system according to the first embodiment is for performing scanning of an intersection point where two perpendicular rebars 100 intersect each other to detect coordinates of two pairs of intersection points and identifying an array direction of the rebars 100 on the basis of the two pairs of intersection points. By comparison, the present embodiment is for performing scanning of rebars 100 with a plurality of scanned trajectories T having different diameters to detect coordinates of a plurality of intersection points and identifying array directions of the rebars 100 from coordinates of adjacent intersection points.

Figure 14:
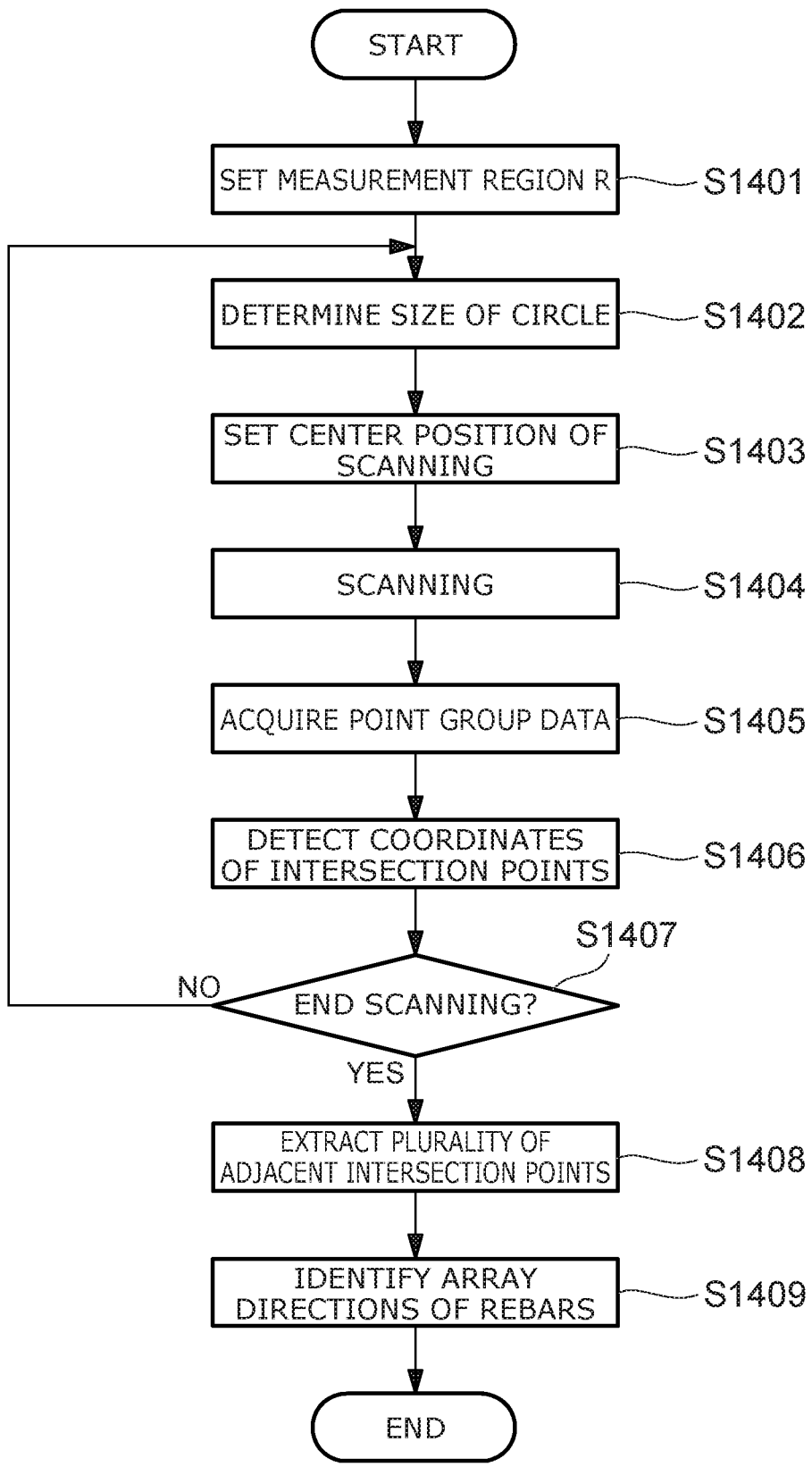
FIG. 14 is a flow chart showing processes executed by the calculation control unit.
Figure 15:
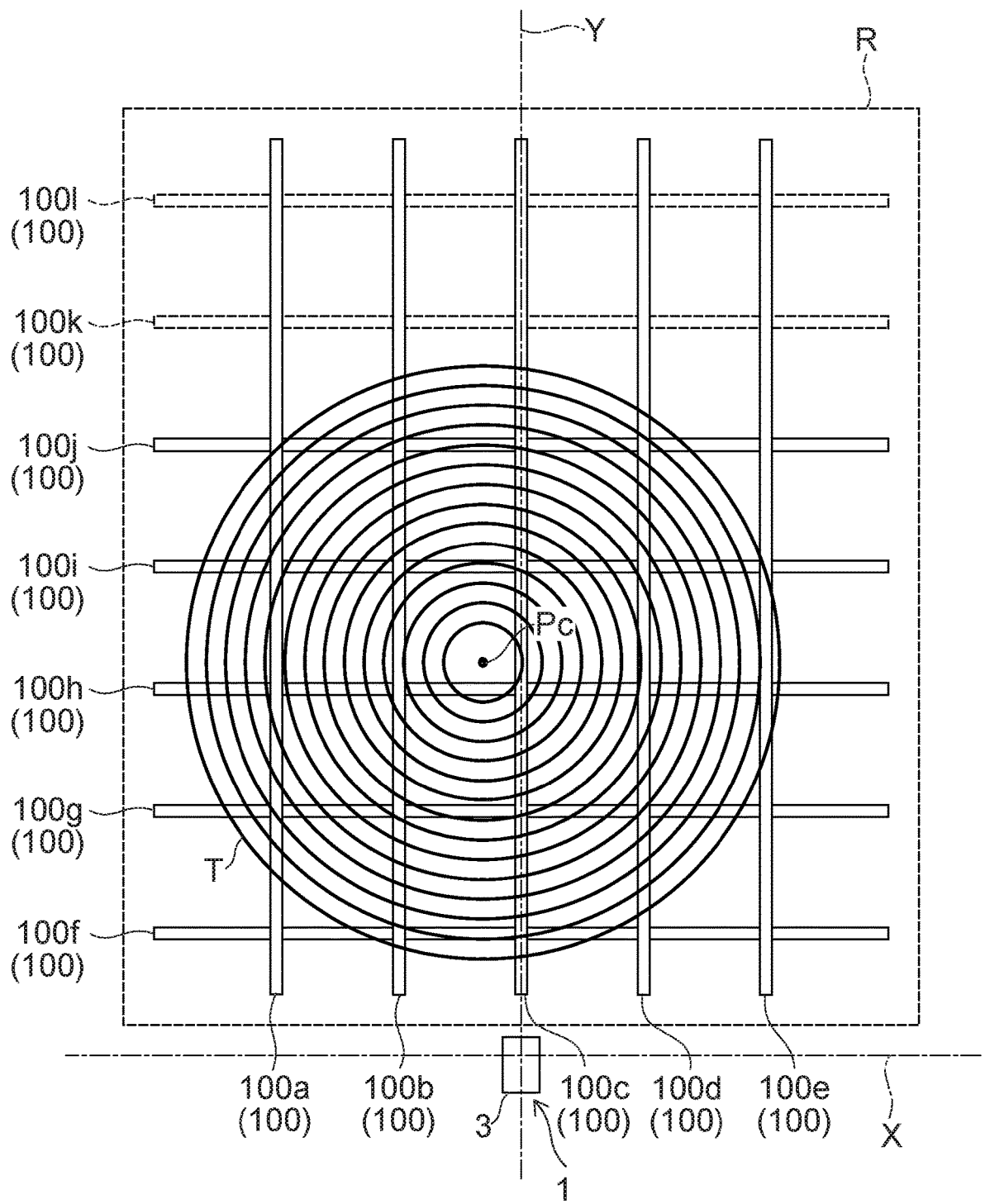
FIG. 15 is an X-Y plan view showing a state where rebars are scanned.
Figure 16:
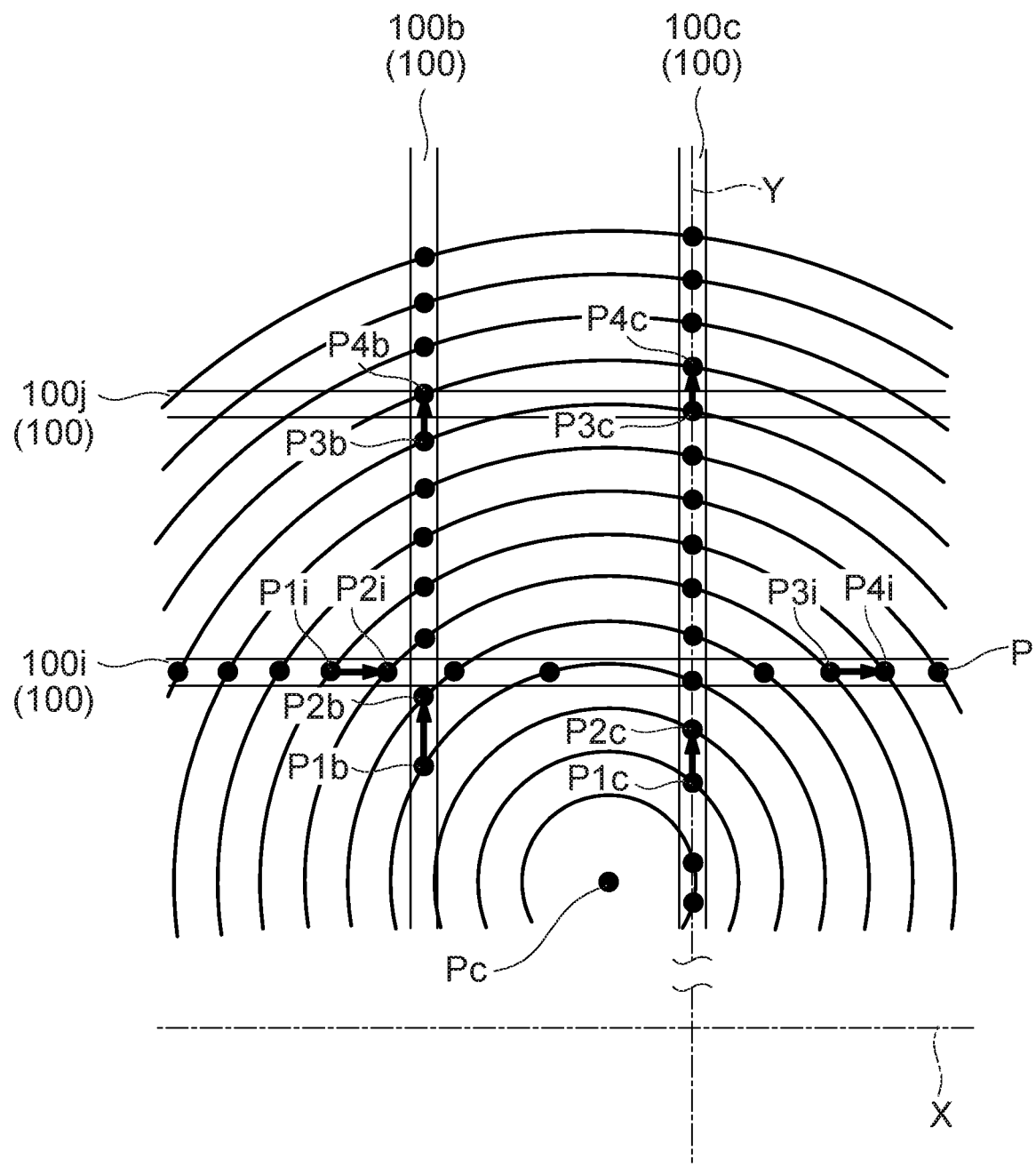
FIG. 16 is a partial enlarged view of the X-Y plan view shown in FIG. 15.

Processes executed by the calculation control unit 19 included in the measurement system according to the present embodiment will be described with reference to FIG. 14. FIG. 14 is a flow chart showing processes executed by the calculation control unit 19. FIG. 15 is an X-Y plan view showing a state where rebars 100 are scanned. FIG. 16 is a partial enlarged view of the X-Y plan view shown in FIG. 15.

In step S1401, the calculation control unit 19 sets a measurement region R. The measurement region R is a region set in order to narrow down coordinates to be detected as coordinates of intersection points of the rebars 100 and scanned trajectories with the measurement light 23. The measurement region R set in the present embodiment is similar to the measurement region R set in the first embodiment.

In step S1402, the calculation control unit 19 determines a size of a circle of the scanned trajectory T with the measurement light 23 that irradiates the measurement region R during scanning.

In step S1403, the calculation control unit 19 sets the center position Pc of scanning at a prescribed position in the measurement region R set in step S1401. The prescribed position may be a position determined in advance or a position designated by the operator via an operation screen of the operating apparatus 4. The calculation control unit 19 calculates the horizontal angle $\theta 1$ and the vertical angle $\theta 2$ of a measurement point relative to the reference optical axis O so as to perform scanning around the set center position Pc.

In step S1404, the calculation control unit 19 performs scanning on the basis of the horizontal angle $\theta 1$ and the vertical angle $\theta 2$ calculated in step S1403. The process executed by the calculation control unit 19 in step S1404 is similar to the process executed by the calculation control unit 19 in step S804 of the first embodiment.

In step S1405, on the basis of the horizontal angle θ1 and the vertical angle θ2 of the measurement light 23 calculated in step S1403 and distance measurement data of the plurality of measurement points SP stored in the first storage unit 20, the calculation control unit 19 acquires point group data that is an aggregate of three-dimensional coordinates of the plurality of measurement points SP. The process executed by the calculation control unit 19 in step S1405 is similar to the process executed by the calculation control unit 19 in step S805 of the first embodiment.

In step S1406, the calculation control unit 19 detects coordinates of intersection points P which indicate positions where the scanned trajectory T with the measurement light 23 and the rebars 100 intersect each other from the point group data stored in the first storage unit 20 in step S1405. The plurality of intersection points P shown in FIG. 16 indicate positions where the scanned trajectory T with the measurement light 23 and the rebars 100 intersect each other.

In step S1407, the calculation control unit 19 determines whether or not the scanning of the rebars 100 with the measurement light 23 is to be ended, and when a positive determination is made (YES in S1407), the calculation control unit 19 advances the process to step S1408, but when a negative determination is made (NO in S1407), the calculation control unit 19 once again executes the process of step S1402. When once again executing step S1402, for example, the size of the circle is set in step S1402 so that the size of the circle increases by a certain rate. In addition, for example, the center position Pc of the scanning is prevented from changing in step S1403.

By repetitively performing the processes from step S1402 to step S1407, the size of the circle of the scanned trajectory T with the measurement light 23 in the measurement region R gradually increases while keeping the center position Pc of the scanning at a constant position. Accordingly, as shown in FIG. 15, a plurality of scanned trajectories T with concentric circular shapes around the center position Pc are generated.

In step S1408, the calculation control unit 19 extracts sets of a plurality of adjacent intersection points (for example, two adjacent intersection points) from the plurality of intersection points P detected in step S1406. As shown in FIG. 16, for example, as the plurality of two adjacent intersection points, the calculation control unit 19 extracts six sets of adjacent intersection points including an intersection point P1b and an intersection point P2b, an intersection point P3b and an intersection point P4b, an intersection point P1c and an intersection point P2c, an intersection point P3c and an intersection point P4c, an intersection point P1i and an intersection point P2i, and an intersection point P3i and an intersection point P4i.

In step S1409, the calculation control unit 19 identifies array directions of the rebars 100 on the basis of coordinates of a pair of adjacently arranged intersection points extracted in step S1408. Once the process of step S1409 ends, the calculation control unit 19 ends the processes of the present flow chart. When identifying an array direction of the rebar 100b, the calculation control unit 19 respectively calculates a vector connecting the intersection point P1b and the intersection point P2b and a vector connecting the intersection point P3b and the intersection point P4b, and identifies the array direction of the rebar 100b by averaging the two vectors.

In a similar manner, when identifying an array direction of the rebar 100c, the calculation control unit 19 respectively calculates a vector connecting the intersection point P1c and the intersection point P2c and a vector connecting the intersection point P3c and the intersection point P4c, and identifies the array direction of the rebar 100c by averaging the two vectors. In a similar manner, when identifying an array direction of the rebar 100i, the calculation control unit 19 respectively calculates a vector connecting the intersection point P1i and the intersection point P2i and a vector connecting the intersection point P3i and the intersection point P4i, and identifies the array direction of the rebar 100i by averaging the two vectors.

After the process of identifying the array directions of the rebar 100 is executed by the processes shown in FIG. 14, the calculation control unit 19 controls a deflection operation of the deflecting unit 35 so that the center position Pc of the scanning moves at prescribed intervals (for example, regular intervals in a three-dimensional space defined by the axis X, the axis Y, and the axis Z) in the region where it is estimated that the rebars 100 are to be arranged.

By performing scanning with respect to each center position Pc, the calculation control unit 19 can detect coordinates of intersection points of the rebars 100a to 100l and the scanned trajectory T with the measurement light 23. Since the array direction of the plurality of rebars 100 shown in FIG. 14 is identified in advance by the processes of identifying the array direction of the rebars 100, by moving the center position Pc of the scanning in the identified array direction, the plurality of rebars 100 can be reliably measured. As described earlier with respect to the measurement system according to the first embodiment, the center position Pc of the scanning may be moved above the rebars 100 in the identified array direction or moved between the plurality of rebars 100 in the identified array direction.

Operational advantages of the measurement system according to the present embodiment described above will now be described. With the measurement system according to the present embodiment, since coordinates of a pair of intersection points arranged adjacent to each other are highly likely to be a measurement result of the same rebar 100, the array direction of the rebar 100 can be reliably identified on the basis of coordinates of the pair of the intersection points arranged adjacent to each other.

In addition, with the measurement system according to the present embodiment, a plurality of array directions can be calculated on the basis of coordinates of a plurality of pairs of intersection points and an array direction of the rebar 100 can be identified by performing, for example, an averaging process.

Furthermore, with the measurement system according to the present embodiment, by scanning a region including the first rebar 100 and the second rebar 100 which is arranged in a direction perpendicular to the first rebar by a plurality of circular scanned trajectories having different diameters, coordinates of a plurality of intersection points of the first rebar 100 included in this region and the measurement light 23 can be detected in an efficient manner.

Embodiments of the present invention have been described above. However, it is to be understood that the present invention is not limited to the embodiments described above and various modifications can be made without departing from the scope of the appended claims. The configurations of the embodiments described above can be partially omitted or arbitrarily combined in manners that differ from those described above.

While a rebar is described as a measurement object in the description provided above, other modes may be adopted as long as the measurement object is formed in a linear shape.

While the deflecting unit 35 is constituted by the pair of optical prisms 36a and 36b in the description provided above, other modes may be adopted. For example, a similar function to the pair of optical prisms 36a and 36b may be achieved using a two-axis galvanometer mirror.

What is claimed is:

1. A measurement apparatus, comprising:
a distance measuring unit, the distance measuring unit including a light producing element which produces measurement light; a measurement light emitting unit which emits the measurement light; a light receiving unit which receives reflected measurement light; and a light receiving element which receives the reflected measurement light and generates a light reception signal; and the distance measuring unit measuring a distance to a measurement object on the basis of the light reception signal from the light receiving element;
a deflecting unit which deflects a direction of emission of the measurement light with respect to a reference optical axis and which is capable of performing scanning with the measurement light with respect to a prescribed center in a circumferential direction; and
a control unit which controls the distance measuring unit and the deflecting unit, wherein
the control unit detects coordinates of intersection points of the measurement object that is formed in a linear shape and a scanned trajectory with the measurement light on the basis of a distance measurement result by the distance measuring unit and the direction of emission that is deflected by the deflecting unit, and identifies an array direction of the measurement object on the basis of coordinates of a plurality of the intersection points;
wherein,
the measurement object includes a first measurement object that extends in a linear shape in a first direction and a second measurement object that extends in a linear shape in a second direction perpendicular to the first direction,
the first measurement object and the second measurement object are adjacently arranged in a grid pattern, and
the control unit controls a deflection operation of the deflecting unit so that the prescribed center is arranged at an intersection position where the first measurement object and the second measurement object intersect with each other, detects coordinates of two pairs of the intersection points arranged at point-symmetric positions with respect to the prescribed center, identifies an array direction of the first measurement object on the basis of the coordinates of one of the two pairs of the intersection points, and identifies an array direction of the second measurement object on the basis of the coordinates of the other of the two pairs of the intersection points.

2. The measurement apparatus according to claim 1, wherein
the control unit controls the deflection operation of the deflecting unit so that, when four of the intersection points are detected, a center of gravity of coordinates of the four intersection points matches the prescribed center.

3. The measurement apparatus according to claim 1, wherein
the control unit identifies, when detecting a plurality of the intersection points, an array direction of the measurement object on the basis of coordinates of a pair of the intersection points arranged adjacent to each other.

4. The measurement apparatus according to claim 3, wherein
the control unit calculates a plurality of array directions on the basis of coordinates of a plurality of pairs of the intersection points respectively arranged adjacent to each other, and identifies an array direction of the measurement object on the basis of the plurality of array directions.

5. The measurement apparatus according to claim 3, wherein
the measurement object includes a first measurement object that extends in a linear shape in a first direction and a second measurement object that extends in a linear shape in a second direction perpendicular to the first direction,
the first measurement object and the second measurement object are adjacently arranged in a grid pattern, and
the control unit sets an approximately planer region including the first measurement object and the second measurement object, and detects coordinates included in the region as coordinates of an intersection point of the measurement object and the measurement light.

6. The measurement apparatus according to claim 4, wherein
the measurement object includes a first measurement object that extends in a linear shape in a first direction and a second measurement object that extends in a linear shape in a second direction perpendicular to the first direction,
the first measurement object and the second measurement object are adjacently arranged in a grid pattern, and
the control unit sets an approximately planer region including the first measurement object and the second measurement object, and detects coordinates included in the region as coordinates of an intersection point of the measurement object and the measurement light.

7. The measurement apparatus according to claim 5, wherein
the control unit detects coordinates of a plurality of pairs of the intersection points by scanning the region with the measurement light in a plurality of circular scanned trajectories having different diameters.

8. The measurement apparatus according to claim 6, wherein
the control unit detects coordinates of a plurality of pairs of the intersection points by scanning the region with the measurement light in a plurality of circular scanned trajectories having different diameters.

9. A control method of a measurement apparatus which measures a distance to a measurement object,
the measurement apparatus including:
a distance measuring unit, the distance measuring unit including a light producing element which produces measurement light; a measurement light emitting unit which emits the measurement light; a light receiving unit which receives reflected measurement light, and a light receiving element which receives the reflected measurement light and generates a light reception signal;
a deflecting unit which deflects a direction of emission of the measurement light with respect to a reference optical axis and which is capable of performing scanning with the measurement light with respect to a prescribed center in a circumferential direction; and a control unit that controls the distance measuring unit and the deflecting unit, the control method comprising the steps of:

measuring a distance to the measurement object on the basis of the light reception signal from the light receiving element;

detecting coordinates of intersection points of the measurement object that is formed in a linear shape and a scanned trajectory with the measurement light on the basis of a distance measurement result in the step of measuring a distance and the direction of emission that is deflected by the deflecting unit; and identifying an array direction of the measurement object on the basis of coordinates of a plurality of the intersection points detected in the step of detecting coordinates of an intersection point;

wherein, the measurement object includes a first measurement object that extends in a linear shape in a first direction and a second measurement object that extends in a linear shape in a second direction perpendicular to the first direction, the first measurement object and the second measurement object are adjacently arranged in a grid pattern, and the control unit controls a deflection operation of the deflecting unit so that the prescribed center is arranged at an intersection position where the first measurement object and the second measurement object intersect with each other, detects coordinates of two pairs of the intersection points arranged at point-symmetric positions with respect to the prescribed center, identifies an array direction of the first measurement object on the basis of the coordinates of one of the two pairs of the intersection points, and identifies an array direction of the second measurement object on the basis of the coordinates of the other of the two pairs of the intersection points.

* * * * *